(12) United States Patent
Sato

(10) Patent No.: US 8,447,999 B2
(45) Date of Patent: May 21, 2013

(54) ELECTRICAL POWER SAVING SYSTEM

(75) Inventor: Tetsuya Sato, Osaka (JP)

(73) Assignee: Panasonic Corporation, Osaka (JP)

(*) Notice: Subject to any disclaimer, the term of this patent is extended or adjusted under 35 U.S.C. 154(b) by 388 days.

(21) Appl. No.: 12/866,967

(22) PCT Filed: Feb. 12, 2009

(86) PCT No.: PCT/JP2009/000550
§ 371 (c)(1),
(2), (4) Date: Aug. 10, 2010

(87) PCT Pub. No.: WO2009/101804
PCT Pub. Date: Aug. 20, 2009

(65) Prior Publication Data
US 2011/0047394 A1 Feb. 24, 2011

(30) Foreign Application Priority Data

Feb. 13, 2008 (JP) ................................. 2008-032208

(51) Int. Cl.
*G06F 1/00* (2006.01)
*H04N 5/222* (2006.01)

(52) U.S. Cl.
USPC ...................................... 713/310; 348/333.13

(58) Field of Classification Search
USPC .............................. 713/300–340; 348/333.13
See application file for complete search history.

(56) References Cited

U.S. PATENT DOCUMENTS 5,659,762 A     8/1997  Sawada et al.
6,772,354 B2 *  8/2004  Takenaka et al. ............. 713/310

(Continued)

FOREIGN PATENT DOCUMENTS

JP     7-295672     11/1995
JP     2003-9035    1/2003

(Continued)

OTHER PUBLICATIONS

International Search Report issued Apr. 21, 2009 in International (PCT) Application No. PCT/JP2009/000550.

(Continued)

*Primary Examiner* — Paul R Myers
(74) *Attorney, Agent, or Firm* — Wenderoth, Lind & Ponack, LLP

(57) ABSTRACT

An electrical power saving system that achieves efficient electricity consumption of apparatuses connected via a communication network includes at least first and second apparatuses connected via the communication network. The first and second apparatuses each include: a transmission and reception unit that transmits and receives a control command via the communication network, the control command being a command by which one apparatus controls another apparatus; and an operation state switching unit that switches an operation state according to the control command. The first and second apparatuses each have, as operation states of different electricity consumption, a first OFF operation mode in which the apparatus is in a power-OFF state but a part of the apparatus is supplied with power, and a second OFF operation mode of lower electricity consumption than the first OFF operation mode. The operation state switching unit in the second apparatus switches the operation state of the second apparatus from the first OFF operation mode to the second OFF operation mode in the case where, when the second apparatus is in the first OFF operation mode, the transmission and reception unit in the second apparatus receives a control command instructing to switch the operation state, from the first apparatus.

6 Claims, 21 Drawing Sheets

U.S. PATENT DOCUMENTS

| | | | |
|---|---|---|---|
| 7,574,505 B2 * | 8/2009 | Park et al. | 709/224 |
| 8,352,768 B2 * | 1/2013 | Starr et al. | 713/323 |
| 2003/0149492 A1 | 8/2003 | Munezane | |
| 2006/0279430 A1 | 12/2006 | Arai | |

FOREIGN PATENT DOCUMENTS

| | | |
|---|---|---|
| JP | 2007-13930 | 1/2007 |
| JP | 2007-141068 | 6/2007 |
| JP | 2007-180697 | 7/2007 |
| JP | 2007-192758 | 8/2007 |

OTHER PUBLICATIONS

Hitachi, Ltd., Matsushita Electric Industrial Co., Ltd., Philips Consumer Electronics, International B.V., Silicon Image, Inc., Sony Corporation, Thomson Inc. and Toshiba Corporation, *"High-Definition Multimedia Interface Specification Version 1.3a"*, Nov. 10, 2006.

* cited by examiner

FIG. 5A

| Operation mode \ Function | Power-ON operation mode 1 | Power-ON operation mode 2 | Power-OFF operation mode 1 | | Power-OFF operation mode 2 | | Operation mode 3 (full OFF mode) |
|---|---|---|---|---|---|---|---|
| | | | TV power ON | TV power OFF | TV power ON | TV power OFF | |
| Recording function | Operational | Operational | Operational | Operational | Operational | Operational | Non-operational |
| IP communication function | Operational | Operational | Operational | Operational | Non-operational | Non-operational | Non-operational |
| LED clock display | Operational | Operational | Operational | Non-operational | Non-operational | Non-operational | Non-operational |
| HDMI video and audio output function | Operational | Operational | Non-operational | Non-operational | Non-operational | Non-operational | Non-operational |

FIG. 5B

| Operation mode \ Function | Power-ON operation mode 1 | Power-ON operation mode 2 | Power-OFF operation mode 1 | | Power-OFF operation mode 2 | | Operation mode 3 (full OFF mode) |
|---|---|---|---|---|---|---|---|
| | | | TV power ON | TV power OFF | TV power ON | TV power OFF | |
| LED clock display | Operational | Operational | Operational | Non-operational | Non-operational | Non-operational | Non-operational |
| HDMI video and audio output function | Operational | Operational | Non-operational | Non-operational | Non-operational | Non-operational | Non-operational |

FIG. 5C

| Operation mode \ Function | Power-ON operation mode 1 | Power-ON operation mode 2 | Power-OFF operation mode 1 | Power-OFF operation mode 2 | Operation mode 3 (full OFF mode) |
|---|---|---|---|---|---|
| LED lamp | Operational | Operational | Operational | Non-operational | Non-operational |
| Video and audio output | Operational | Operational | Non-operational | Non-operational | Non-operational |

FIG. 8

| Time of day | Operation mode | | |
|---|---|---|---|
| | Monday to Friday | Saturday | Sunday |
| Morning (AM 6:00~PM 0:00) | Operation mode 2 | Operation mode 2 | Operation mode 1 |
| Afternoon (PM 0:00~PM 6:00) | Operation mode 1 | Operation mode 1 | Operation mode 1 |
| Evening (PM 6:00~PM 23:00) | Operation mode 1 | Operation mode 1 | Operation mode 1 |
| Night (PM 23:00~AM 6:00) | Operation mode 2 | Operation mode 1 | Operation mode 2 |

| Operation state | Operation mode | Electricity consumption |
|---|---|---|
| Operation state E1 | Power-ON operation mode 1<br>Power-ON operation mode 2 | 40W |
| Operation state E2 | Power-OFF operation mode 1 | 10W |
| Operation state E3 | Power-OFF operation mode 2<br>Operation mode 3 (full OFF mode) | 0.5W |

FIG. 22

| Operation mode / Function | Power-ON operation mode 1 | Power-ON operation mode 2 | Power-OFF operation mode 1 | | Power-OFF operation mode 2 | | Operation mode 3 |
|---|---|---|---|---|---|---|---|
| | | | TV power ON | TV power OFF | TV power ON | TV power OFF | |
| HDMI repeater function | Operational | Operational | Operational | Operational | Operational | Operational | Non-operational |
| Amplifier function | Operational | Operational | Operational | Non-operational | Operational | Non-operational | Non-operational |

ELECTRICAL POWER SAVING SYSTEM

TECHNICAL FIELD

The present invention relates to an electrical power saving system, and particularly relates to an AV system and an AV apparatus control method in which electricity consumption of the system is controlled by switching operation modes of apparatuses connected via a communication network.

BACKGROUND ART

Conventionally, there is an Audio/Visual (AV) system in which a video recording and reproduction apparatus such as a Digital Versatile Disc (DVD) recorder is connected to a television receiver (hereafter referred to as "TV"). In the AV system, video and audio are viewed, and an external AV amplifier and an external speaker are further connected to output audio from the external speaker. In order to view and operate each apparatus in such an AV system, the user needs to perform an operation of input selection or reproduction by separately using a remote controller (hereafter referred to as "remote control") corresponding to the apparatus. This requires a complex operation.

One method for solving this problem is a method that employs a High-Definition Multimedia Interface (HDMI) standard. In HDMI, a feature named Consumer Electronics Control (CEC) is defined (Non-patent Reference 1). CEC is a feature that connects a TV and various AV apparatuses by HDMI cables, and controls the AV apparatuses using CEC commands which enable bidirectional control command transmission and reception, via CEC buses included in the HDMI cables.

Moreover, the HDMI standard has a feature that a reproduction apparatus such as a DVD recorder can read reproduction capability information of a connected apparatus to adapt video and audio data to an output format of the connected apparatus or encrypt the video and audio data, and transmit the video and audio data.

For example, reproduction capability information is transferred from an apparatus (hereafter referred to as "HDMI input apparatus") including a HDMI input unit, such as a TV or an AV amplifier, to an apparatus (hereafter referred to as "HDMI output apparatus") to which the HDMI input apparatus is connected, using a Display Data Channel (DDC) bus that is a unidirectional connection. "DDC" mentioned here is a standard created by the Video Electronics Standards Association (VESA) as a feature of communicating model information and the like of a display to the HDMI output apparatus, in order to achieve plug and play for the display. Information transferred by DDC includes model information and a reproducible image and audio format of the HDMI input apparatus, a physical address assigned to the HDMI apparatus, and so on.

In the HDMI standard, a logical address (hereafter "LA") and a physical address (hereafter "PA") are defined for each apparatus, for communication by CEC commands.

A PA is an address determined so as to reflect a connection topology of the HDMI output apparatus, and is unidirectionally transmitted from the HDMI input apparatus to the HDMI output apparatus. The PA is determined by adding a value that differs for each HDMI input unit, to a PA obtained by the HDMI input apparatus.

An apparatus that includes both a HDMI input unit and a HDMI output unit, such as an AV amplifier, obtains a PA of the AV amplifier itself from an apparatus to which the HDMI output unit is connected. The AV amplifier then adds a value corresponding to the HDMI input unit to the obtained PA, thereby determining a PA of a HDMI output apparatus connected to the AV amplifier. Accordingly, a PA of an apparatus (hereafter "root apparatus") that includes a HDMI input unit and serves as a root is determined hierarchically as "0. 0. 0. 0".

For instance, a TV that Includes no HDMI output unit and only includes a HDMI input unit always has the PA "0. 0. 0. 0", as a root apparatus. A PA of an apparatus connected to the root apparatus is determined in such a manner that, as an example, a PA of an apparatus connected to a first HDMI input unit of the root apparatus is "1. 0. 0. 0" and a PA of an apparatus connected to a second HDMI input unit of the root apparatus is "2. 0. 0. 0".

An apparatus that includes both an input unit and an output unit further determines a PA for each input unit, from a PA of the apparatus itself. As an example, a PA of an apparatus connected to a first input unit of the apparatus having the PA "1. 0. 0. 0" is "1. 1. 0. 0", and a PA of an apparatus connected to a second input unit of the apparatus having the PA "1. 0. 0. 0" is "1. 2. 0. 0".

On the other hand, a LA is assigned to each CEC-capable apparatus connected via HDMI, and used as a destination address for CEC command transmission and reception.

In CEC, there are a command that is transmitted to a designated destination, and a broadcast command that is notified to all CEC-capable apparatuses connected via HDMI. Communication is performed by combining these commands in CEC.

Note that a CEC command is made up of a LA of a transmitter apparatus, a LA of a destination apparatus, an opcode, and an operand.

Furthermore, HDMI defines control commands such as <Active Source> for performing input selection, <Standby> for powering OFF an apparatus, <Give Power Status> for querying a power state of an apparatus, <Polling Message> for ascertaining whether or not an apparatus of a destination LA is present on a communication network, and <Vendor Command> enabling each manufacturer to independently define an apparatus operation. In HDMI, various cooperative operations can be realized by transmitting and receiving these control commands in combination between CEC-capable apparatuses connected via HDMI.

Non-patent Reference 1: High-Definition Multimedia Interface Specification Version 1.3a

DISCLOSURE OF INVENTION

Problems that Invention is to Solve

In CEC, the <Standby> command is defined as a command for powering OFF a connected apparatus. An apparatus such as a DVD recorder has a plurality of operation states even in a power-OFF state. These operation states differ in electricity consumption.

In conventional techniques, however, it is impossible to control the plurality of operation states in the connected apparatus. This causes inefficient consumption of electricity as in the case where, even when the user is not using an apparatus, a function in the apparatus is energized. In order to improve electricity consumption efficiency by a user operation, the user needs to switch the operation state of each connected apparatus by operating a button or a remote control of the apparatus. This requires a complex operation for the user.

Besides, in order to check an amount of electricity consumption of the apparatus, the user needs to newly connect a watt-hour meter or the like and perform measurement. Thus, a complex operation is needed for improving electricity consumption efficiency.

The present invention has been made in view of the above problems, and has an object of realizing an electrical power saving system that achieves efficient electricity consumption of apparatuses connected via a communication network.

Means to Solve the Problems

To solve the above problems, an electrical power saving system according to the present invention is an electrical power saving system including at least a first apparatus and a second apparatus that are connected to each other via a communication network, each of the first apparatus and the second apparatus including: a transmission and reception unit that transmits and receives a control command via the communication network, the control command being a command by which one apparatus controls another apparatus; and an operation state switching unit that switches an operation state according to the control command, wherein each of the first apparatus and the second apparatus has at least a first OFF operation mode and a second OFF operation mode as operation states that differ in electricity consumption, the first OFF operation mode being an operation state in which the apparatus is in a power-OFF state but a part of the apparatus is supplied with power, and the second OFF operation mode being an operation state of lower electricity consumption than the first OFF operation mode, and the operation state switching unit in the second apparatus switches the operation state of the second apparatus from the first OFF operation mode to the second OFF operation mode in the case where, when the second apparatus is in the first OFF operation mode, the transmission and reception unit in the second apparatus receives a control command instructing to switch the operation state, from the first apparatus.

In this way, an operation state of a connected apparatus can be switched by a control command of another apparatus and the like. Hence, in a system where a plurality of apparatuses that each have a plurality of operation states of different electricity consumption are connected via a communication network such as HDMI, the operation state of the plurality of apparatuses can be controlled so as to improve electricity consumption efficiency. This makes it possible to realize an electrical power saving system that achieves efficient electricity consumption of apparatuses connected via a communication network.

Preferably, the second apparatus further includes a timer unit that counts an elapse of a predetermined time, wherein the operation state switching unit in the second apparatus switches the operation state of the second apparatus from the first OFF operation mode to the second OFF operation mode, when the timer unit counts the elapse of the predetermined time during which the second apparatus is in the first OFF operation mode. Here, the second apparatus may further include a determination unit that determines the operation state of the first apparatus according to the control command transmitted and received by the transmission and reception unit in the second apparatus, wherein the transmission and reception unit in the first apparatus transmits, as the control command, a control command including the operation state of the first apparatus, to the second apparatus, and the operation state switching unit in the second apparatus switches the operation state of the second apparatus from the first OFF operation mode to the second OFF operation mode in the case where, when the second apparatus is in the first OFF operation mode, the determination unit determines that the first apparatus is in an operation state in which the first apparatus is in a power-OFF state, the operation state in which the first apparatus is in a power-OFF state including the first OFF operation mode and the second OFF operation mode.

In this way, the operation state of the apparatus can be switched not only by the control command of another apparatus, but also by using the elapse of the time set in the apparatus or the state of another apparatus as a trigger.

Moreover, to solve the above problems, an electrical power saving system according to the present invention is an electrical power saving system including at least a video display apparatus and a video recording apparatus that are connected to each other via a communication network, each of the video display apparatus and the video recording apparatus including: a transmission and reception unit that transmits and receives a control command via the communication network, the control command being a command by which one apparatus controls another apparatus; and an operation state switching unit that switches an operation state according to the control command, wherein each of the video display apparatus and the video recording apparatus has at least a first OFF operation mode and a second OFF operation mode as operation states that differ in electricity consumption, the first OFF operation mode being an operation state in which the apparatus is in a power-OFF state but a part of the apparatus is supplied with power, and the second OFF operation mode being an operation state of lower electricity consumption than the first OFF operation mode, and the operation state switching unit in the video recording apparatus switches the operation state of the video recording apparatus from the first OFF operation mode to the second OFF operation mode in the case where, when the video recording apparatus is in the first OFF operation mode, the transmission and reception unit in the video recording apparatus receives a control command instructing to switch the operation state, from the video display apparatus.

Note that the present invention can be realized not only as a system, but also as an apparatus or an integrated circuit including processing units of the system, or a method including steps that correspond to the processing units of the system.

Effects of the Invention

According to the present invention, it is possible to realize an electrical power saving system that achieves efficient electricity consumption of connected apparatuses.

In detail, by switching an operation state of a connected apparatus by a simple user operation and the like so as not to energize an unused function, an electrical power saving system that achieves efficient electricity consumption of apparatuses connected via a communication network can be realized.

Moreover, there is also an advantageous effect that the user can check an amount of electricity consumption measured without connecting a new apparatus.

BRIEF DESCRIPTION OF DRAWINGS

FIG. 5A is a diagram showing a correspondence table of operation modes and functions in the DVD recorder 20 in the first embodiment of the present invention.

FIG. 5B is a diagram showing a correspondence table of operation modes and functions in the set-top box 30 in the first embodiment of the present invention.

FIG. 5C is a diagram showing a correspondence table of operation modes and functions in the TV 10 in the first embodiment of the present invention.

FIG. 8 is a diagram showing an example of a mode switching time setting table in the TV 10 in the first embodiment of the present invention.

FIG. 22 is a diagram showing an example of a correspondence table of operation modes and functions in the AV amplifier 65.

Figure 1:
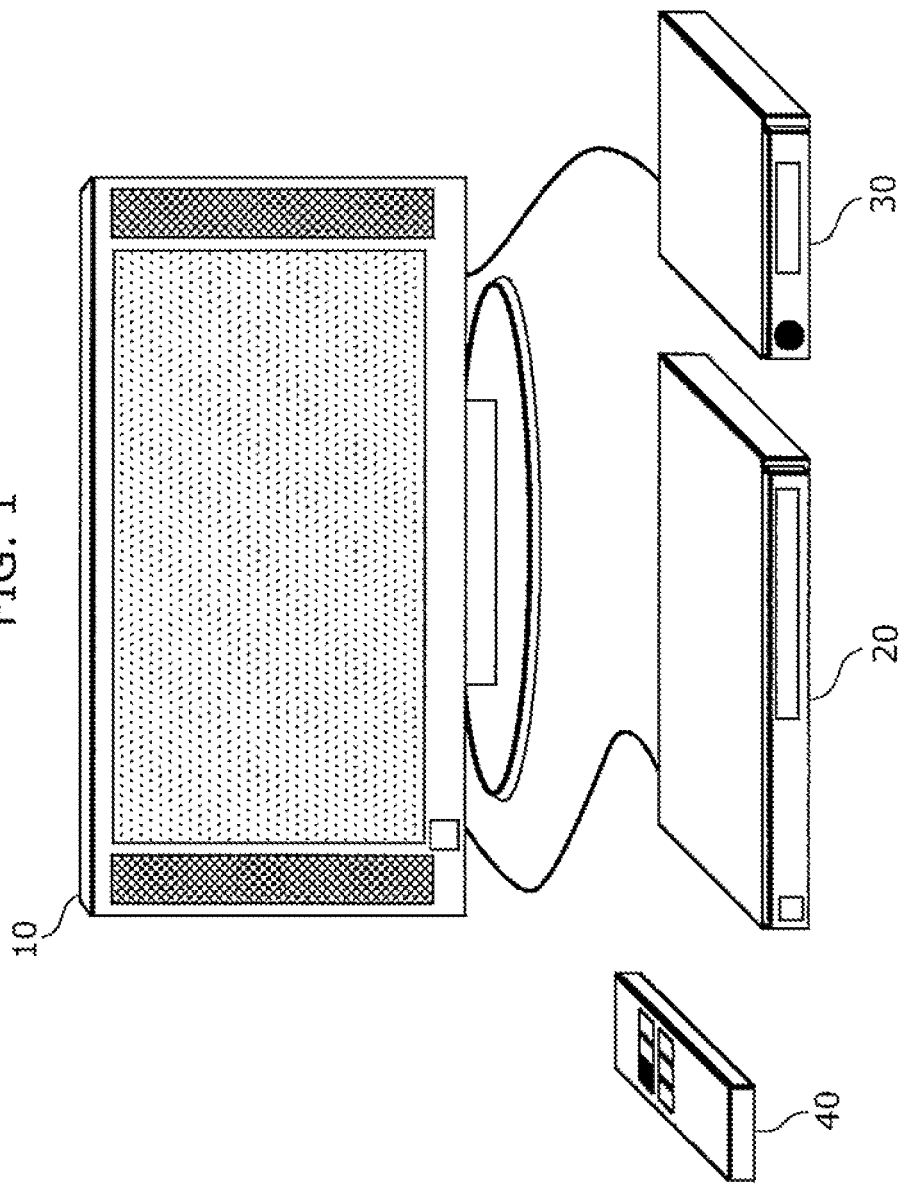
FIG. 1 is a structural diagram of an AV system in a first embodiment of the present invention.

NUMERICAL REFERENCES 10, 50 TV
20, 60 DVD recorder
30, 70 Set-top box
40 Remote control
65 AV amplifier
101, 201, 301, 501 Operation mode switching timer
102, 202, 302, 502 Electricity consumption amount storage unit
103, 203, 303, 503 Saved electricity consumption amount storage unit
104, 204, 304 Electricity consumption storage unit
105, 205, 305 Remote control reception unit
106 Video output unit
107 Audio output unit
108 Active source apparatus storage unit
208, 308 Active source state storage unit
109 Connected apparatus list storage unit
110, 210, 310, 510, 610, 710 Microcomputer
111, 211, 311, 511, 611, 711 CEC communication unit
112 TMDS decoding unit
212, 312 Decoding unit
113 TMDS input unit
114, 115 HDMI input unit
214, 314 HDMI output unit
120, 220, 320 Tuner
121, 221, 321 Operation function setting storage unit
122, 222, 322 Operation state storage unit
216, 316 TV power state determination unit
217 Recording timer
218 IP communication unit
219 Recording unit

BEST MODE FOR CARRYING OUT THE INVENTION

The following describes embodiments of an AV system and an AV apparatus control method according to the present invention in detail, with reference to drawings.

First Embodiment

Structure

Figure 2:
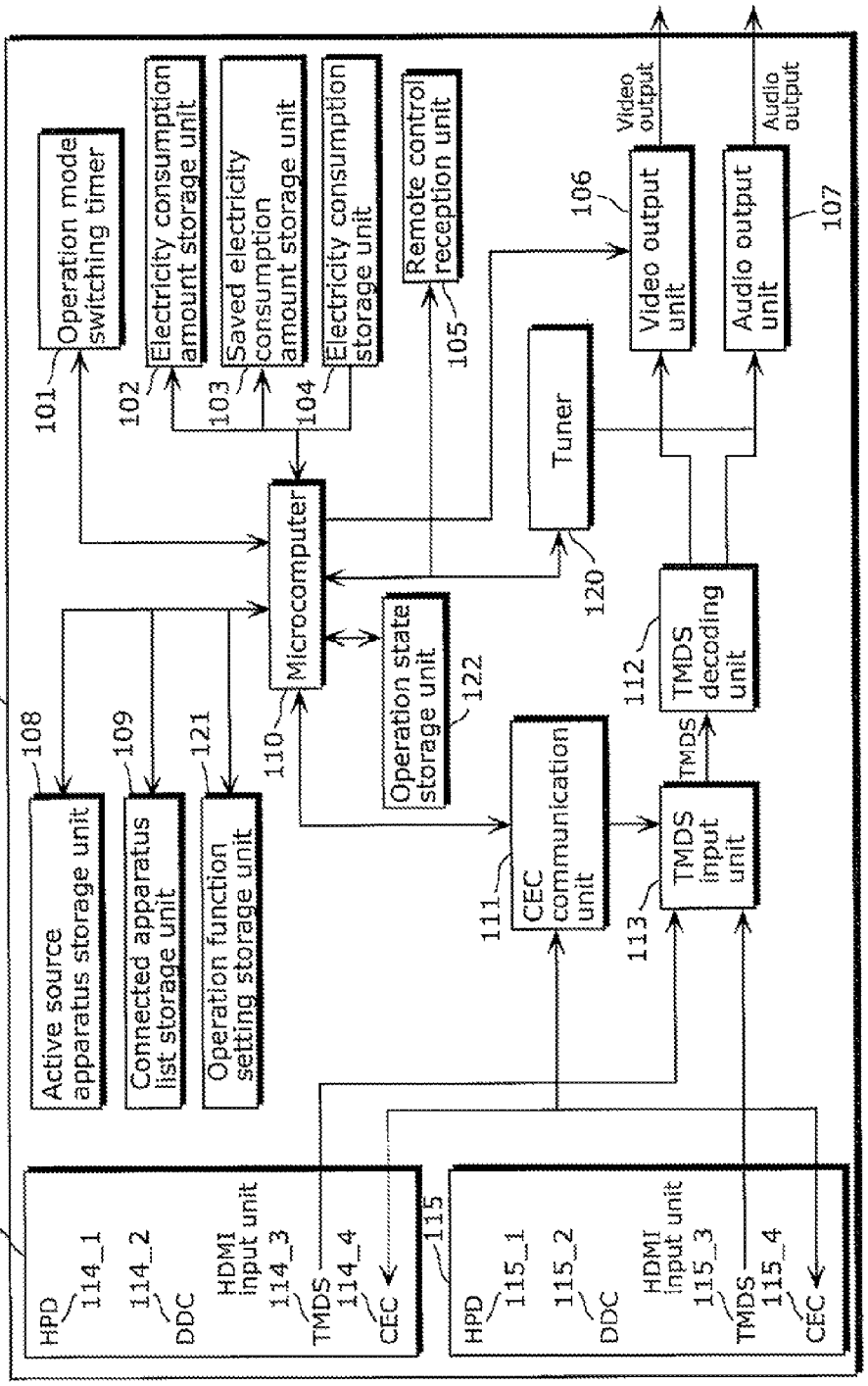
FIG. 2 is a functional block diagram of a TV 10 in the first embodiment of the present invention.
Figure 3:
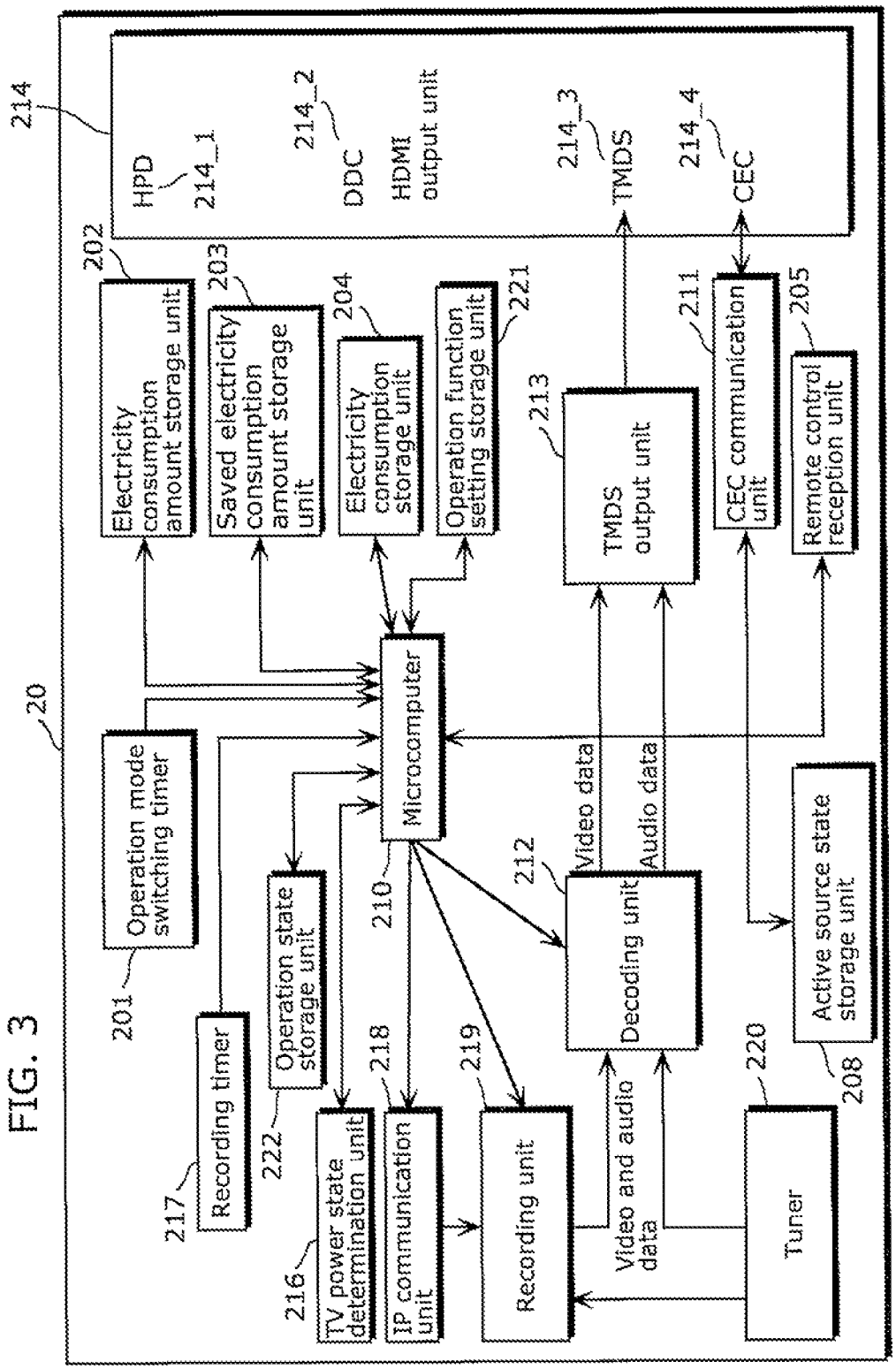
FIG. 3 is a functional block diagram of a DVD recorder 20 in the first embodiment of the present invention.
Figure 4:
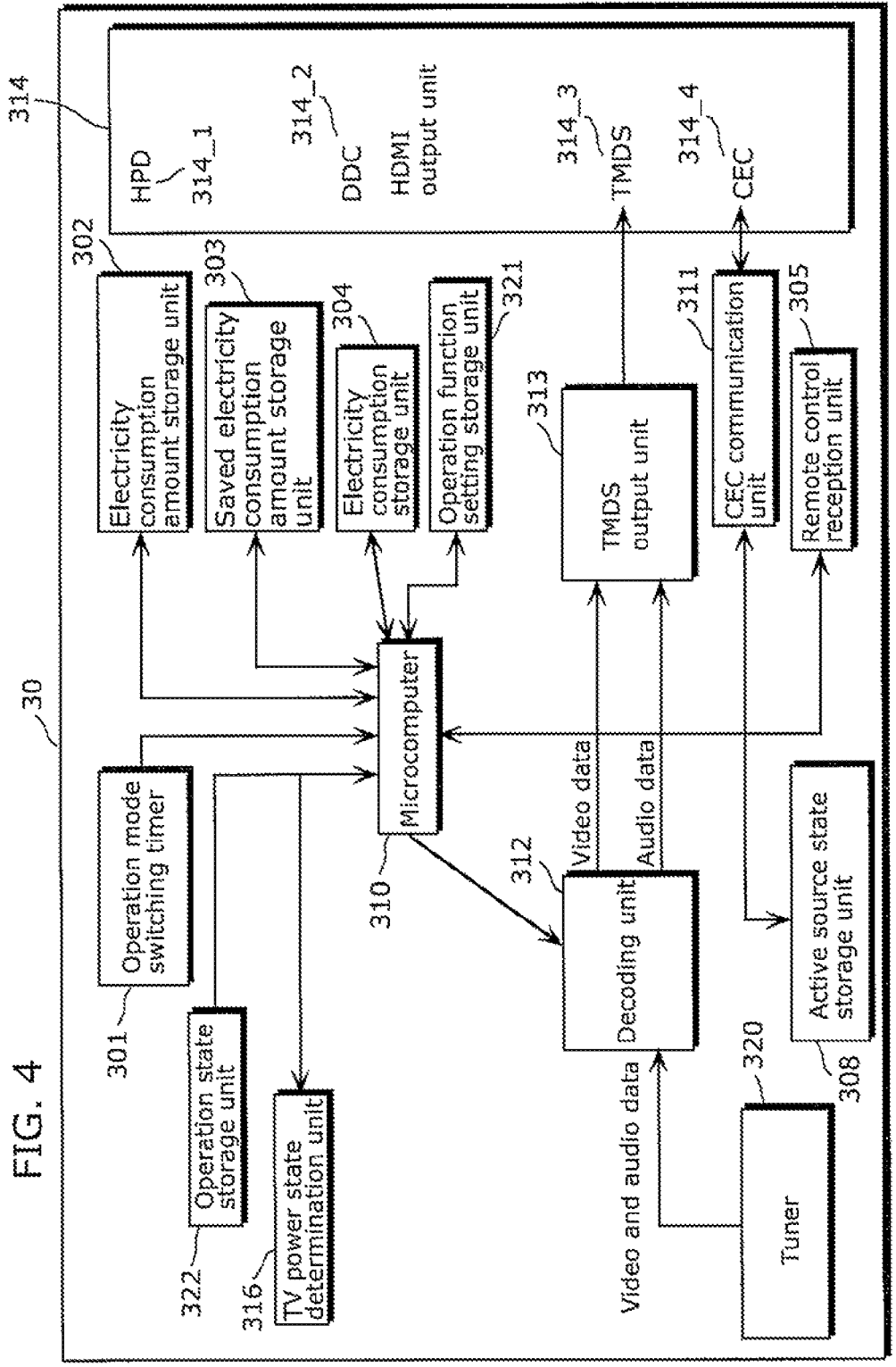
FIG. 4 is a functional block diagram of a set-top box 30 in the first embodiment of the present invention.

FIG. 1 is a diagram schematically showing a structure of an AV system in a first embodiment. FIG. 2 is a functional block diagram of a TV 10 in the first embodiment. FIG. 3 is a functional block diagram of a DVD recorder 20 in the first embodiment. FIG. 4 is a functional block diagram of a set-top box 30 in the first embodiment.

Note that the TV 10 in the first embodiment is an example of a first apparatus according to the present invention, and each of the DVD recorder 20 and the set-top box 30 in the first embodiment is an example of a second apparatus according to the present invention.

As shown in FIG. 1, the AV system in the first embodiment includes the TV 10, the DVD recorder 20, and the set-top box 30. The AV system also includes, for example, a remote control 40.

In the AV system, the DVD recorder 20 and the set-top box 30 are connected to the TV 10 via HDMI cables. CEC lines in HDMI are connected in a CEC communication unit 111 in the TV 10. The TV 10, the DVD recorder 20, and the set-top box 30 are capable of performing transmission and reception of a CEC command as a control command with each other.

The TV 10 is an apparatus that outputs video and audio outputted from an apparatus connected via a HDMI cable, and a broadcast signal received via an antenna (not shown).

The TV 10 includes an operation mode switching timer 101, an electricity consumption amount storage unit 102, a saved electricity consumption amount storage unit 103, an electricity consumption storage unit 104, a remote control reception unit 105, a video output unit 106, an audio output unit 107, an active source apparatus storage unit 108, a connected apparatus list storage unit 109, a microcomputer 110, the CEC communication unit 111, a TMDS decoding unit 112, a TMDS input unit 113, HDMI input units 114 and 115, a tuner 120, an operation function setting storage unit 121, and an operation state storage unit 122.

The operation mode switching timer 101 includes a timer and an operation mode switching time storage unit.

The operation mode switching timer 101 stores a time 1 to switch to an operation mode 1 and a time 2 to switch to an operation mode 2, via the microcomputer 110. When the time 1 or the time 2 is reached, the operation mode switching timer 101 notifies the microcomputer 110 that the corresponding set time is reached.

The electricity consumption amount storage unit 102 includes a current-day storage unit that temporarily stores an amount of electricity consumption of a current day, and a log recording unit that stores an amount of electricity consumption of a past fixed time period. Note that the log recording unit in the electricity consumption amount storage unit 102 is composed of a nonvolatile storage device.

The saved electricity consumption amount storage unit 103 includes a current-day storage unit that temporarily stores an amount of saved electricity consumption of the current day, and a log recording unit that stores an amount of saved electricity consumption of the past fixed time period. Note that the log recording unit in the saved electricity consumption amount storage unit 103 is composed of a nonvolatile storage device.

The electricity consumption storage unit 104 stores electricity consumption in each of a plurality of operation states of the TV 10.

The remote control reception unit 105 receives a signal transmitted from the remote control 40, and notifies the microcomputer 110 of the signal. Here, as an input unit, the remote control 40 includes a plurality of buttons such as a power button, a menu display button, and up, down, left, and right buttons, and a remote control signal transmission unit.

The video output unit 106 is a display unit, and displays video outputted from the TMDS decoding unit 112 or the tuner 120. The video output unit 106 also performs On Screen Display (OSD) by superimposing a message and a menu on input video, according to a notification from the microcomputer 110.

The audio output unit 107 is a speaker unit, and outputs audio outputted from the TMDS decoding unit 112 or the tuner 120.

The active source apparatus storage unit 108 stores, when the CEC communication unit 111 receives an <Active Source> command from another apparatus, a LA and a PA of the apparatus transmitting the command. When the CEC communication unit 111 transmits an <Active Source> command, on the other hand, the active source apparatus storage unit 108 stores information that the TV 10 is an active source.

The connected apparatus list storage unit 109 receives a response to a <Polling Message> command transmitted by the CEC communication unit 111 and a command from another apparatus, and stores a list of apparatuses connected to the communication network.

The microcomputer 110 is a device that executes a program. The microcomputer 110 receives a notification from any of the operation mode switching timer 101, the remote control reception unit 105, and the CEC communication unit 111. Upon receiving the notification, the microcomputer 110 reads or writes information in each storage unit such as the electricity consumption amount storage unit 102, the saved electricity consumption amount storage unit 103, the electricity consumption storage unit 104, the active source apparatus storage unit 108, the connected apparatus list storage unit 109, the operation function setting storage unit 121, and the operation mode switching timer 101, and also controls the CEC communication unit 111, the tuner 120, the video output unit 106, and the like. The microcomputer 110 also controls various functions of the TV 10 not shown.

The CEC communication unit 111 is an example of a device that transmits and receives a control command via the communication network. The CEC communication unit 111 performs transmission and reception of a CEC command.

The HDMI input unit 114 is a HDMI input port. In this embodiment, the HDMI input unit 114 is HDMI-connected with the DVD recorder 20, and performs reception of video and audio data and bidirectional communication of a control message. The HDMI input unit 114 is used for transmission of a HPD signal 114_1, a DDC signal 114_2, a TMDS signal 114_3, and a CEC signal 114_4.

The HDMI input unit 115 is a HDMI input port. In this embodiment, the HDMI input unit 115 is HDMI-connected with the set-top box 30, and performs reception of video and audio data and bidirectional communication of a control message. The HDMI input unit 115 is used for transmission of a HPD signal 115_1, a DDC signal 115_2, a TMDS signal 115_3, and a CEC signal 115_4.

Here, the HDMI input units 114 and 115 are not limited to HDMI. For instance, the HDMI input units 114 and 115 may each be an interface corresponding to an adapted communication mode or the like that provides the function described above, regardless of whether it is wired or wireless.

The TMDS input unit 113 receives TMDS data using the TMDS signal 114_3 or 115_3 of the HDMI input unit 114 or 115, and outputs the TMDS data to the TMDS decoding unit 112.

The TMDS decoding unit 112 TMDS-decodes the TMDS data, and outputs decoded video data to the video output unit 106 and decoded audio data to the audio output unit 107.

The tuner 120 decodes a broadcast signal received via an antenna (not shown). The tuner 120 outputs decoded video data to the video output unit 106, and decoded audio data to the audio output unit 107.

The operation function setting storage unit 121 stores a table showing correspondence between various operation states and various functions of the TV 10, as shown in FIG. 5C. Note that the functions of the TV 10 shown in FIG. 5C are merely an example, and the present invention is not limited to these functions, so long as all functions of the TV 10 are associated with operation states.

The operation state storage unit 122 is a storage device. When the TV 10 changes in operation state, the operation state storage unit 122 stores a start time of the operation state and information showing the operation state. The operation state storage unit 122 also stores a flag showing whether or not the state change to the operation state is caused by the operation mode switching timer 101. The operation state storage unit 122 further stores information that the operation state continues, in an operation duration time storage unit at predetermined time intervals.

The DVD recorder 20 is an apparatus that records a broadcast signal received via an antenna (not shown), and outputs a recorded video and audio signal via a HDMI cable. As shown in FIG. 3, the DVD recorder 20 includes an operation mode switching timer 201, an electricity consumption amount storage unit 202, a saved electricity consumption amount storage unit 203, an electricity consumption storage unit 204, a remote control reception unit 205, an active source state storage unit 208, a microcomputer 210, a CEC communication unit 211, a decoding unit 212, a TMDS output unit 213, a HDMI output unit 214, a TV power state determination unit 216, a recording timer 217, an IP communication unit 218, a recording unit 219, a tuner 220, an operation function setting storage unit 221, and an operation state storage unit 222.

The operation mode switching timer 201 includes a timer and an operation mode switching time storage unit. The operation mode switching timer 201 stores the time 1 to switch to the operation mode 1 and the time 2 to switch to the operation mode 2, via the microcomputer 210. When the time 1 or the time 2 is reached, the operation mode switching timer 201 notifies the microcomputer 210 that the corresponding set time is reached.

The electricity consumption amount storage unit 202 includes a current-day storage unit that temporarily stores an amount of electricity consumption of the current day, and a log recording unit that stores an amount of electricity consumption of the past fixed time period. Note that the log recording unit in the electricity consumption amount storage unit 202 is composed of a nonvolatile storage device.

The saved electricity consumption amount storage unit 203 includes a current-day storage unit that temporarily stores an amount of saved electricity consumption of the current day, and a log recording unit that stores an amount of saved electricity consumption of the past fixed time period. Note that the log recording unit in the saved electricity consumption amount storage unit 203 is composed of a nonvolatile storage device.

The electricity consumption storage unit 204 stores electricity consumption in each of a plurality of operation states of the DVD recorder 20.

The remote control reception unit 205 receives a signal transmitted from the remote control 40 (not shown) corresponding to the DVD recorder 20, and notifies the microcomputer 210 of the signal. Here, as mentioned earlier, the remote control 40 includes the plurality of buttons such as the power button, the menu display button, and the up, down, left, and right buttons, and the remote control signal transmission unit, as the input unit.

The active source state storage unit 208 stores information that the DVD recorder 20 is an active source, when the CEC communication unit 211 transmits an <Active Source> command. When the CEC communication unit 211 receives an <Active Source> command from another apparatus, on the other hand, the active source state storage unit 208 deletes the information that the DVD recorder 20 is in an active source state.

The microcomputer 210 is a device that executes a program. The microcomputer 210 receives a notification from any of the operation mode switching timer 201, the remote control reception unit 205, the CEC communication unit 211, the TV power state determination unit 216, and the recording timer 217. Upon receiving the notification, the microcomputer 210 reads or writes information in each storage unit such as the electricity consumption storage unit 204, the electricity consumption amount storage unit 202, the saved electricity consumption amount storage unit 203, the active source state storage unit 208, and the operation function setting storage unit 221, and also controls the CEC communication unit 211, the decoding unit 212, the IP communication unit 218, the recording unit 219, the tuner 220, and the like. The microcomputer 210 also controls other various functions of the DVD recorder 20 not shown.

For example, the microcomputer 210 controls an IP communication unit (IP communication function) that communicates with another apparatus, and a LED clock display unit (LED clock display function) that displays a current time, received channel information, and the like. The microcomputer 210 also controls the recording unit 219 (recording function) that records a broadcast signal (containing video and audio data) outputted from the tuner. The microcomputer 210 can perform power ON/OFF control on each of these components individually.

The CEC communication unit 211 is an example of a device that transmits and receives a control command via the communication network. The CEC communication unit 211 performs transmission and reception of a CEC command.

Note that the communication network for transmitting and receiving the control command is not limited to CEC, and a wired or wireless network of IP or the like may instead be used.

The decoding unit 212 appropriately decodes video and audio data received from the tuner 220 or the recording unit 219, and outputs the decoded video data and audio data to the TMDS output unit 213.

The TMDS output unit 213 outputs the video data and the audio data via a TMDS signal 214_3 in the HDMI, output unit 214, as a TMDS data signal.

The HDMI output unit 214 outputs the TMDS data received from the TMDS output unit 213, using the TMDS signal 214_3.

The TV power state determination unit 216 receives a CEC command transmitted from the TV 10 via the CEC communication unit 211, and determines whether the TV 10 is powered ON or OFF by querying a power state of the TV 10. The TV power state determination unit 216 notifies the microcomputer 210 of a result of the determination.

The recording timer 217 is a timer for starting programmed recording of a broadcast. When a set time is reached, the recording timer 217 notifies the recording unit 219 and the microcomputer 210 of the recording start.

The IP communication unit 218 is an example of a function of the DVD recorder 20, and performs information transmission and reception with a connected apparatus (not shown) by IP communication.

The recording unit 219 is a device that records a broadcast signal outputted from the tuner 220, in a storage device such as a hard disk.

The tuner 220 outputs a broadcast signal received via an antenna (not shown), to the recording unit 219 or the decoding unit 212.

The operation function setting storage unit 221 stores a table showing correspondence between various operation states and various functions of the DVD recorder 20, as shown in FIG. 5A.

Note that the functions of the DVD recorder 20 shown in FIG. 5A are merely an example, and the present invention is not limited to these functions. All functions of the DVD recorder 20 are associated with operation states.

The operation state storage unit 222 is a storage device. When the DVD recorder 20 changes in operation state, the operation state storage unit 222 stores a start time of the operation state and information showing the operation state. The operation state storage unit 222 also stores a flag showing whether or not the state change to the operation state is caused by the operation mode switching timer 201. The operation state storage unit 222 further stores information that the operation state continues, in an operation duration time storage unit at predetermined time intervals.

The set-top box 30 is an apparatus that decodes a broadcast signal received via a broadcast signal cable (not shown), and outputs a video and audio signal via a HDMI cable.

As shown in FIG. 4, the set-top box 30 includes an operation mode switching timer 301, an electricity consumption amount storage unit 302, a saved electricity consumption amount storage unit 303, an electricity consumption storage unit 304, a remote control reception unit 305, an active source state storage unit 308, a microcomputer 310, a CEC communication unit 311, a decoding unit 312, a TMDS output unit 313, a HDMI output unit 314, a TV power state determination unit 316, a tuner 320, an operation function setting storage unit 321, and an operation state storage unit 322.

The operation mode switching timer 301 includes a timer and an operation mode switching time storage unit. The operation mode switching timer 301 stores the time 1 to switch to the operation mode 1 and the time 2 to switch to the operation mode 2, via the microcomputer 310. When the time 1 or the time 2 is reached, the operation mode switching timer 301 notifies the microcomputer 310 that the corresponding set time is reached.

The electricity consumption amount storage unit 302 includes a current-day storage unit that temporarily stores an amount of electricity consumption of the current day, and a log recording unit that stores an amount of electricity consumption of the past fixed time period. Note that the log recording unit in the electricity consumption amount storage unit 302 is composed of a nonvolatile storage device.

The saved electricity consumption amount storage unit 303 includes a current-day storage unit that temporarily stores an amount of saved electricity consumption of the current day, and a log recording unit that stores an amount of saved electricity consumption of the past fixed time period. Note that the log recording unit in the saved electricity consumption amount storage unit 303 is composed of a nonvolatile storage device.

The electricity consumption storage unit 304 stores electricity consumption in each of a plurality of operation states of the set-top box 30.

The remote control reception unit 305 receives a signal transmitted from the remote control 40 (not shown) corresponding to the DVD recorder 20, and notifies the microcomputer 310 of the signal. Here, as mentioned earlier, the remote control 40 includes the plurality of buttons such as the power button, the menu display button, and the up, down, left, and right buttons, and the remote control signal transmission unit, as the input unit.

The active source state storage unit 308 stores information that the set-top box 30 is an active source, when the CEC communication unit 311 transmits an <Active Source> command. When the CEC communication unit 311 receives an <Active Source> command from another apparatus, on the other hand, the active source state storage unit 308 deletes the information that the set-top box 30 is in an active source state.

The microcomputer 310 is a device that executes a program. The microcomputer 310 receives a notification from any of the operation mode switching timer 301, the remote control reception unit 305, the CEC communication unit 311, and the TV power state determination unit 316. Upon receiving the notification, the microcomputer 310 reads or writes information in each storage unit such as the electricity consumption storage unit 304, the electricity consumption amount storage unit 302, the saved electricity consumption amount storage unit 303, the active source state storage unit 308, and the operation function setting storage unit 321, and also controls the CEC communication unit 311, the decoding unit 312, the tuner 320, and the like. The microcomputer 310 also controls various functions of the set-top box 30 not shown.

The CEC communication unit 311 is an example of a device that transmits and receives a control command via the communication network. The CEC communication unit 311 performs transmission and reception of a CEC command.

Note that the communication network for transmitting and receiving the control command is not limited to CEC, and a wired or wireless network of IP or the like may instead be used.

The decoding unit 312 appropriately decodes video and audio data received from the tuner 320, and outputs the decoded video data and audio data to the TMDS output unit 313.

The TMDS output unit 313 outputs the video data and the audio data via a TMDS signal 314_3 in the HDMI output unit 314, as a TMDS data signal.

The HDMI output unit 314 outputs the TMDS data received from the TMDS output unit 313, using the TMDS signal 314_3.

The TV power state determination unit 316 receives a CEC command transmitted from the TV 10 via the CEC communication unit 311, and determines whether the TV 10 is powered ON or OFF by querying a power state of the TV 10. The TV power state determination unit 316 notifies the microcomputer 310 of a result of the determination.

The tuner 320 outputs a broadcast signal received via an antenna (not shown), to the recording unit 219 or the decoding unit 212.

The operation state storage unit 322 is a storage device. When the set-top box 30 changes in operation state, the operation state storage unit 322 stores a start time of the operation state and information showing the operation state.

The operation state storage unit 322 also stores a flag showing whether or not the state change to the operation state is caused by the operation mode switching timer 301. The operation state storage unit 322 further stores information that the operation state continues, in an operation duration time storage unit at predetermined time intervals.

The operation function setting storage unit 321 stores a table showing correspondence between various operation states and various functions of the set-top box 30, as shown in FIG. 5B.

Note that the functions of the set-top box 30 shown in FIG. 5B are merely an example, and the present invention is not limited to these functions, so long as all functions of the set-top box 30 are associated with operation states.

<Operation>

(Setting of Operation Mode and Operational Function Combination by the User)

The TV 10, the DVD recorder 20, and the set-top box 30 connected via the communication network store an operation mode and function correspondence table showing a function that is operational in each operation mode, respectively in the operation function setting storage units 121, 221, and 321.

FIGS. 5A, 5B, and 5C respectively show an example of the operation mode and function correspondence table in the DVD recorder 20, the set-top box 30, and the TV 10. In FIGS. 5A, 5B, and 5C, each of the DVD recorder 20, the set-top box 30, and the TV 10 has a plurality of operation modes, in each of which a function is energized so as to be operational or is not energized so as to be non-operational.

For example, in the DVD recorder 20, when the operation mode of the DVD recorder 20 is a power-OFF operation mode 2 and also the TV power state determination unit 216 determines that the TV 10 is powered OFF, the recording function is operational but the IP communication function, the LED clock display function, and a HDMI video and audio output function are non-operational, as shown in FIG. 5A.

Moreover, the DVD recorder 20 in a power-OFF state has at least a power-OFF operation mode 1 and the power-OFF operation mode 2 that differ in electricity consumption, as shown in FIG. 5A. That is, the DVD recorder 20 has, for example, the power-OFF operation mode 1 and the power-OFF operation mode 2. The power-OFF operation mode 1 is a state in which the DVD recorder 20 is in a power-OFF state but a part of the DVD recorder 20 is supplied with power, as in the case where the recording function and a main microcomputer function including the IP communication function and the LED clock display function are energized while the HDMI video and audio output function is not energized. The power-OFF operation mode 2 is a state in which the DVD recorder 20 is in a power-OFF state and fewer functions are operational than in the power-OFF operation mode 1, as in the case where only the recording function is energized while the HDMI video and audio output function and the main microcomputer function are not energized. Thus, fewer functions are energized in the power-OFF operation mode 2 than in the power-OFF operation mode 1, and so the power-OFF operation mode 2 has lower electricity consumption than the power-OFF operation mode 1.

The DVD recorder 20 also has an operation mode 3 (full OFF mode) in which none of the HDMI video and audio output function, the recording function, and the main microcomputer function including the IP communication function and the LED clock display function is energized, as shown in FIG. 5A.

Note that the same applies to the set-top box 30 and the TV 10, and so their description is omitted here.

Though there is also a function such as a remote control reception function that is continuously operational regardless of the operation mode, such a function is not shown in this embodiment. Note that the functions shown in each of FIGS. 5A, 5B, and 5C are merely an example of a part of functions of the corresponding apparatus, and functions associated with operation modes are not limited to such.

The user can change the operation mode and function correspondence table by using the remote control 40 of the TV 10, the DVD recorder 20, and the set-top box 30.

Figure 6:
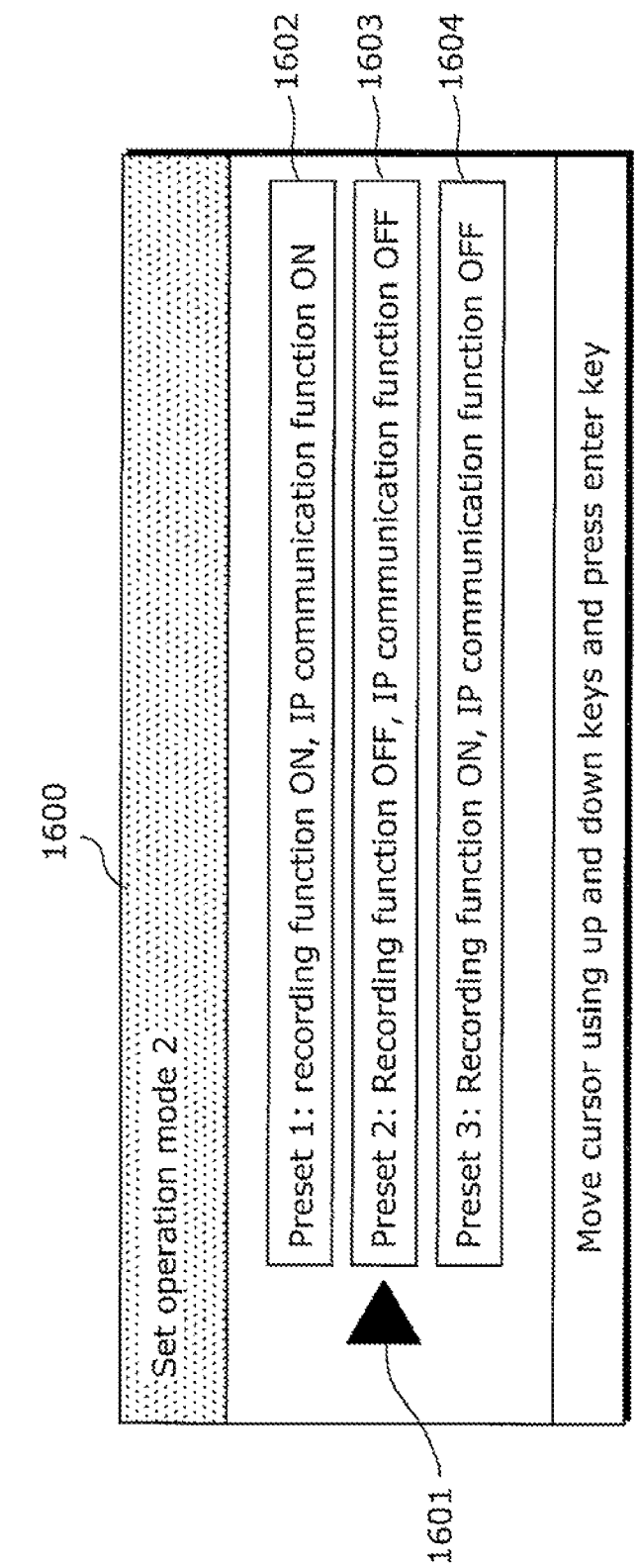
FIG. 6 is a diagram showing an example of a menu for setting an operation mode and a function in the DVD recorder 20 in the first embodiment of the present invention.

FIG. 6 shows an example of a menu for setting an operation mode and a function in the DVD recorder 20 in the first embodiment of the present invention. A menu 1600 is an example of an OSD (On Screen Display) menu display for changing the operation mode and function correspondence in the DVD recorder 20. In FIG. 6, menu items 1602 to 1604 each show an operational function combination when switching to the operation mode, and a cursor 1601 shows a selected menu item.

When the user moves the cursor 1601 and selects a desired menu item through the input unit such as the remote control 40 (not shown) of the DVD recorder 20, the microcomputer 210 rewrites the operation mode and function correspondence table in the operation function setting storage unit 221 so as to have a value corresponding to the selected menu item.

The TV 10 and the set-top box 30 also have the same OSD menu display function. The user can rewrite the operation function setting storage units 121 and 321 by setting the respective apparatuses so that only a desired function is operational in each operation mode.

(Operation Mode Setting According to Time by the Timer in Each Apparatus)

Figure 7:
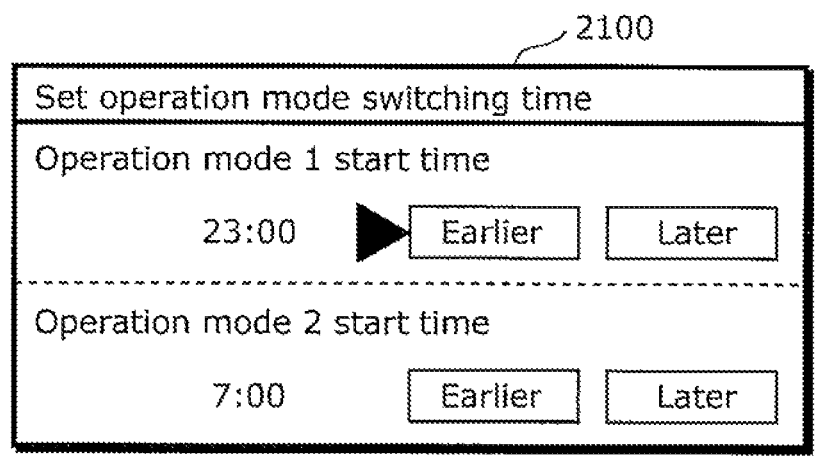
FIG. 7 is a diagram showing an example of an operation mode switching time setting method by an OSD menu display in the TV 10 in the first embodiment of the present invention.

FIG. 7 shows an example of an operation mode switching time setting method by an OSD menu display in the TV 10 in the first embodiment of the present invention.

First, the user designates the time 1 to start operation in the power-ON operation mode 1 and the power-OFF operation mode 1 and the time 2 to start operation in the power-ON operation mode 2 and the power-OFF operation mode 2, through the input unit of the TV 10 beforehand.

For example, the time 1 and the time 2 are set as follows. In a menu such as an OSD menu 2100 displayed by the video output unit 106 in the TV 10, the user changes the start times of the operation mode 1 and the operation mode 2 to desired times by pressing buttons which constitute the input unit of the TV 10 such as the remote control 40.

After the time 1 and the time 2 are determined by the user operation, the TV 10 transmits, from the CEC communication unit 111, an operation mode switching time setting command having the user-designated time 1 and time 2 as a parameter, to the DVD recorder 20 and the set-top box 30 connected with the TV 10. The TV 10 also sets the time 1 and the time 2 in the operation mode switching timer 101.

The DVD recorder 20 and the set-top box 30 receive the operation mode switching time setting command, and set the time 1 and the time 2 designated by the parameter in the received command, respectively in the operation mode switching timers 201 and 301.

When the time 2 is reached, the operation mode switching timer 201 in the DVD recorder 20 notifies the microcomputer 210 that the time 2 is reached.

The microcomputer 210 receives the notification. When the operation mode of the DVD recorder 20 is the power-ON operation mode 1, the microcomputer 210 switches the operation mode to the power-ON operation mode 2. When the operation mode of the DVD recorder 20 is the power-OFF operation mode 1, the microcomputer 210 switches the operation mode to the power-OFF operation mode 2. The microcomputer 210 then starts operation.

Upon switching the operation mode, the DVD recorder 20 references the operation function setting storage unit 221 in the DVD recorder 20. For a function that is set to be non-operational in the switched operation mode, the DVD recorder 20 ends a corresponding program or does not energize the function. For a function that is set to be operational in the switched operation mode, the DVD recorder 20 starts a corresponding program or energizes the function.

For example, in the case where the IP communication unit 218 in the DVD recorder 20 is set to be non-operational in the power-OFF operation mode 2, the DVD recorder 20 ends a program of the IP communication unit 218 or does not energize the IP communication unit 218.

Likewise, when the time 2 is reached, the operation mode switching timer 301 in the set-top box 30 notifies the microcomputer 310 that the time 2 is reached.

The microcomputer 310 receives the notification. When the operation mode of the set-top box 30 is the power-ON operation mode 1, the microcomputer 310 switches the operation mode to the power-ON operation mode 2. When the operation mode of the set-top box 30 is the power-OFF operation mode 1, the microcomputer 310 switches the operation mode to the power-OFF operation mode 2. The microcomputer 310 then starts operation.

Upon switching the operation mode, the set-top box 30 references the operation function setting storage unit 321 in the set-top box 30, in the same manner as the DVD recorder 20. For a function that is set to be non-operational in the switched operation mode, the set-top box 30 ends a corresponding program or does not energize the function. For a function that is set to be operational in the switched operation mode, the set-top box 30 starts a corresponding program or energizes the function.

Likewise, when the time 2 is reached, the operation mode switching timer 101 in the TV 10 notifies the microcomputer 110 that the time 2 is reached.

The microcomputer 110 receives the notification. When the operation mode of the TV 10 is the power-ON operation mode 1, the microcomputer 110 switches the operation mode to the power-ON operation mode 2. When the operation mode of the apparatus is the power-OFF operation mode 1, the microcomputer 110 switches the operation mode to the power-OFF operation mode 2. The microcomputer 110 then starts operation.

The TV 10, the DVD recorder 20, and the set-top box 30 also switch the operation mode according to the respective operation mode switching timers (101, 201, and 301) when the time 1 is reached, in the same way as above.

When the time 1 is reached, the operation mode switching timer 201 in the DVD recorder 20 notifies the microcomputer 210 that the time 1 is reached.

The microcomputer 210 receives the notification. When the operation mode of the DVD recorder 20 is the power-ON operation mode 2, the microcomputer 210 switches the operation mode to the power-ON operation mode 1. When the operation mode of the apparatus is the power-OFF operation mode 2, the microcomputer 210 switches the operation mode to the power-OFF operation mode 1. The microcomputer 210 then starts operation.

Likewise, when the time 1 is reached, the operation mode switching timer 301 in the set-top box 30 notifies the microcomputer 310 that the time 1 is reached.

The microcomputer 310 receives the notification. When the operation mode of the DVD recorder 20 is the power-ON operation mode 2, the microcomputer 310 switches the operation mode to the power-ON operation mode 1. When the operation mode of the apparatus is the power-OFF operation mode 2, the microcomputer 310 switches the operation mode to the power-OFF operation mode 1. The microcomputer 310 then starts operation.

Likewise, when the time 1 is reached, the operation mode switching timer 101 in the TV 10 notifies the microcomputer 110 that the time 1 is reached.

The microcomputer 110 receives the notification. When the operation mode of the TV 10 is the power-ON operation mode 2, the microcomputer 110 switches the operation mode to the power-ON operation mode 1. When the operation mode of the TV 10 is the power-OFF operation mode 2, the microcomputer 110 switches the operation mode to the power-OFF operation mode 1. The microcomputer 110 then starts operation.

As described above, when the time to switch the operation mode of the DVD recorder 20 or the set-top box 30 is designated by the user in the TV 10, the DVD recorder 20 or the set-top box 30 sets the designated time in the operation mode switching timer 201 or 301 on the basis of the control command transmitted from the TV 10. When the designated time is reached, the DVD recorder 20 or the set-top box 30 switches to the operation mode designated by the user. Thus, the operation mode is switched according to the time by the timer in each apparatus.

Note that the operation mode switching time setting is not limited to the above two times. For instance, the operation mode may be designated according to the day and time, as shown in FIG. 8. Moreover, the number of operation modes is not limited to two, and three or more operation modes may be subject to switching.

In addition, the timing of switching the operation mode is not limited to a time of day, and may instead be an elapsed time. In this case, for example, when one operation mode continues for a predetermined elapsed time, the operation mode is switched to another operation mode upon the elapse of the time.

(Operation Mode Switching in Synchronization with Power ON/OFF)

The DVD recorder 20 and the set-top box 30 can also switch to the operation mode 1 or the operation mode 2 in synchronization with the operation of the TV 10, without depending on the operation mode switching timers 201 and 301. The following describes a process whereby the DVD recorder 20 and the set-top box 30 switch to the operation mode 1 or the operation mode 2 in synchronization with the power state of the TV 10, without depending on the operation mode switching timers 201 and 301.

The TV power state determination units 216 and 316 in the DVD recorder 20 and the set-top box 30 detect a change in power state of the TV 10 and determine the power state of the TV 10, respectively via the CEC communication units 211 and 311.

In order to determine the power state of the TV 10, the TV power state determination units 216 and 316 transmit a <Give Power Status> command to query the power state of the TV 10 at regular time intervals.

The TV 10 receives the <Give Power Status> command, and transmits a <Report Power Status> command having a power-ON state or a power-OFF state as a parameter, to the apparatus transmitting the <Give Power Status> command.

By receiving the <Report Power Status> command at the regular time intervals, the TV power state determination units 216 and 316 can detect a change in power state of the TV 10 and determine the power state of the TV 10.

In the case of transmitting a specific CEC command when the TV 10 is powered ON or when the TV 10 is powered OFF, the TV power state determination units 216 and 316 can determine whether the TV 10 is powered ON or OFF, upon receiving the specific CEC command.

For example, in the case of transmitting a <Standby> command when the TV 10 is powered OFF, the TV power state determination units 216 and 316 in the DVD recorder 20 and the set-top box 30 can determine that the TV 10 is powered OFF, upon receiving the <Standby> command from the TV 10.

The following describes a processing flow when the user powers ON the TV 10 by pressing the power button (not shown) on the remote control 40 of the TV 10 or a cabinet of the TV 10.

First, the TV power state determination units 216 and 316 in the DVD recorder 20 and the set-top box 30 detect that the TV 10 is powered ON, and notify the microcomputers 210 and 310 that the TV 10 is powered ON.

Upon detecting the power ON of the TV 10 through the notification, the microcomputers 210 and 310 in the DVD recorder 20 and the set-top box 30 switch the operation mode to the power-ON operation mode 1 or the power-OFF operation mode 1, and start operation.

When the user powers OFF the TV 10 by pressing the power button (not shown) on the remote control 40 of the TV 10 or the cabinet of the TV 10 while the TV 10 is operating in a power-ON state, the TV 10 transmits a <Standby> command for powering OFF a connected apparatus.

The TV power state determination units 216 and 316 in the DVD recorder 20 and the set-top box 30 receive the <Standby> command, and determine that the TV 10 is powered OFF. The TV power state determination units 216 and 316 respectively notify the microcomputers 210 and 310 of a result of the determination.

The microcomputers 210 and 310 in the DVD recorder 20 and the set-top box 30 detect the power OFF of the TV 10 through the notification. Since the <Standby> command has been received, the microcomputers 210 and 310 switch the operation mode to the power-OFF operation mode 2 and start operation.

Thus, the DVD recorder 20 and the set-top box 30 can switch to the operation mode 1 or the operation mode 2, without depending on the operation mode switching timers 201 and 301. That is, the DVD recorder 20 and the set-top box 30 determine whether the TV 10 is powered ON or OFF, and switch the operation mode in synchronization with the power ON or OFF of the TV 10.

Note that the method whereby the TV power state determination units 216 and 316 determine the power state of the TV 10 is not limited to the above method. As an example, the DVD recorder 20 and the set-top box 30 may detect that the TV 10 is powered OFF, by receiving a <Report Power Status> command having a power-OFF state of the TV 10 as a parameter.

(Powering Off the DVD Recorder 20 and the Set-Top Box 30 According to the User'S Viewing Operation)

For example, suppose input selection for video and audio data viewed on the TV 10 is made from the DVD recorder 20 to the set-top box 30 while the DVD recorder 20 is in the operation mode 1 or the operation mode 2.

When the user is viewing video and audio from the set-top box 30 on the TV 10, video and audio data outputted from the DVD recorder 20 cannot be viewed on the TV 10. In such a case, the DVD recorder 20 is powered OFF. The same applies to the set-top box 30. In detail, when the input of the TV 10 is the DVD recorder 20, the set-top box 30 is powered OFF because video and audio data outputted from the set-top box 30 cannot be viewed on the TV 10.

Figure 9:
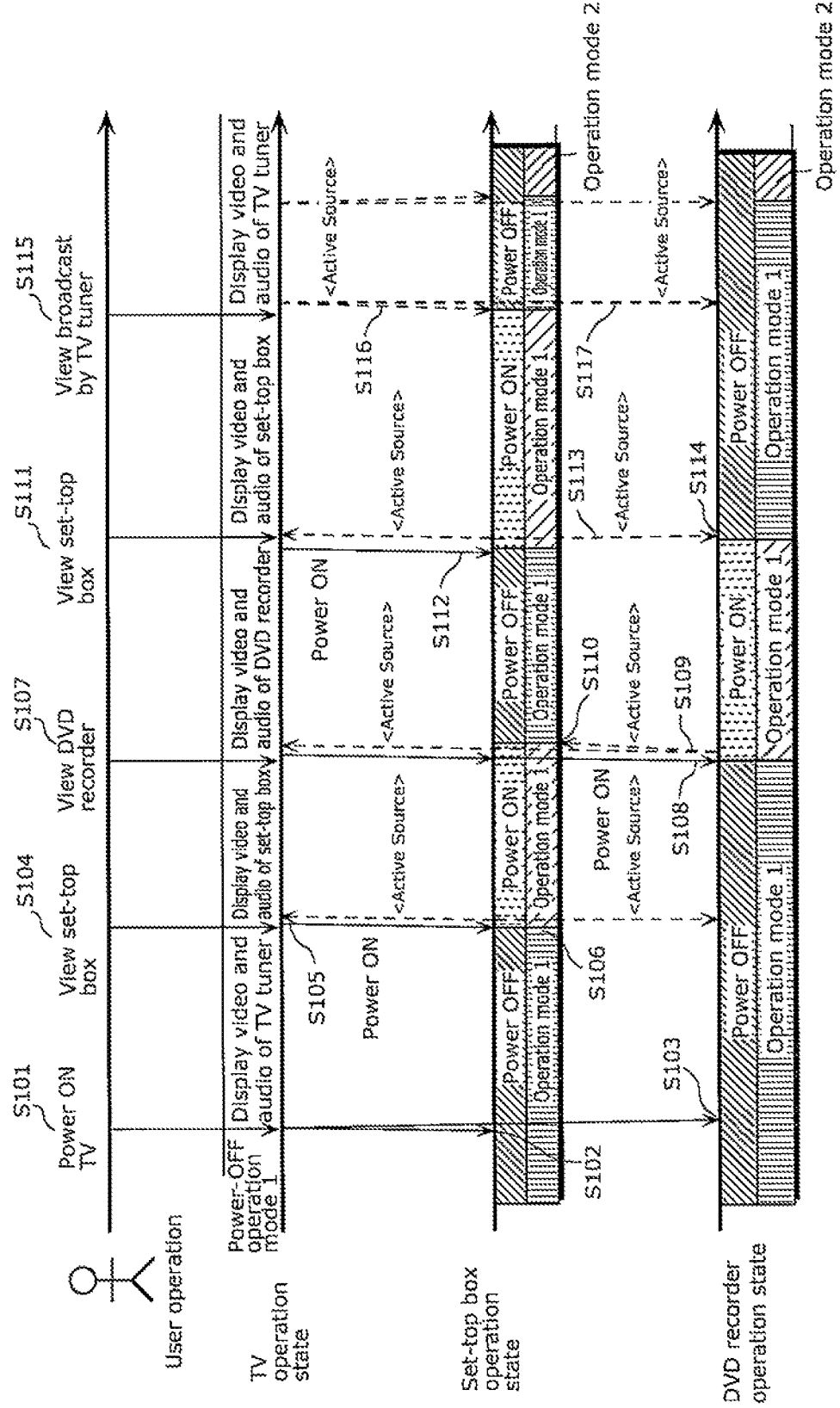
FIG. 9 is a diagram showing an example of a flow of CEC command transmission and reception when the DVD recorder 20 and the set-top box 30 operate according to a user operation in the first embodiment of the present invention.

FIG. 9 shows an example of a flow of CEC command transmission and reception when the DVD recorder 20 and the set-top box 30 operate according to the user's operation. The following describes a process whereby the DVD recorder 20 and the set-top box 30 are powered OFF according to the user's viewing operation of the TV 10, with reference to FIG. 9.

First, the user powers ON the TV 10 by operating the input unit of the TV 10 such as the remote control 40 (Step S101).

After the TV 10 is powered ON, in the case of reproducing video and audio from the tuner 120 included in the TV 10, the TV 10 broadcasts an <Active Source> command to the DVD recorder 20 and the set-top box 30. At this time, both the DVD recorder 20 and the set-top box 30 are not in a power-ON state, so that the DVD recorder 20 and the set-top box 30 perform no operation in response to the <Active Source> command (Steps S102, S103).

However, the TV power state determination units 216 and 316 in the DVD recorder 20 and the set-top box 30 determine that the TV 10 is powered ON by detecting a CEC command transmitted when the TV 10 is powered ON, and notify the microcomputers 210 and 310 that the TV 10 is powered ON.

Upon receiving the notification, the microcomputer 210 references the operation function setting storage unit 221. When the apparatus is in the operation mode 1, the microcomputer 210 activates a function that is operational in a power-ON state of the TV 10 in the power-OFF operation mode 1. When the apparatus is in the operation mode 2, on the other hand, the microcomputer 210 activates a function that is operational in a power-ON state of the TV 10 in the power-OFF operation mode 2.

Likewise, the microcomputer 310 in the set-top box 30 references the operation function setting storage unit 321. When the apparatus is in the operation mode 1, the microcomputer 310 activates a function that is operational in a power-ON state of the TV 10 in the power-OFF operation mode 1. When the apparatus is in the operation mode 2, on the other hand, the microcomputer 310 activates a function that is operational in a power-ON state of the TV 10 in the power-OFF operation mode 2.

Next, to start viewing the set-top box 30, the user performs selection by selecting an OSD menu displayed on the TV 10 or pressing a button on the remote control 40 of the TV 10 (Step S104).

The TV 10 responsively transmits a power-ON command to the set-top box 30 (Step S105).

The set-top box 30 receives the power-ON command, transitions to a power-ON state in the operation mode 1 or the operation mode 2, and starts outputting video and audio (Step S106). When starting the video and audio output, the set-top box 30 transmits an <Active Source> command to the TV 10 and the DVD recorder 20, and stores information that the set-top box 30 is in an active source state, in the active source state storage unit 308 in the set-top box 30.

Next, to start viewing the DVD recorder 20, the user performs selection by selecting a menu displayed on the TV 10 or pressing a button on the remote control 40 of the TV 10 (Step S107).

The TV 10 responsively transmits a power-ON command to the DVD recorder 20 (Step S108).

The DVD recorder 20 receives the power-ON command, and references the operation function setting storage unit 221. The DVD recorder 20 transitions to a power-ON state by operating a function corresponding to the current operation mode. The DVD recorder 20 further starts outputting video and audio. When starting the video and audio output, the DVD recorder 20 transmits an <Active Source> command to the TV 10 and the set-top box 30 (Step S109), and also stores information that the DVD recorder 20 is in an active source state, in the active source state storage unit 208.

Upon receiving the <Active Source> command transmitted in Step S109, the set-top box 30 determines that another apparatus is in an active source state. The set-top box 30 accordingly deletes the information that the set-top box 30 is in an active source state from the active source state storage unit 308, and transitions to a power-OFF state (Step S110).

Here, in Step S110, the microcomputer 310 in the set-top box 30 references the operation function setting storage unit 321. When the apparatus (the set-top box 30) is in the operation mode 1, the microcomputer 310 ends an unnecessary function so as to operate only a function that is operational in a power-ON state of the TV 10 in the power-OFF operation mode 1. When the apparatus is in the operation mode 2, the microcomputer 310 ends an unnecessary function so as to operate only a function that is operational in a power-ON state of the TV 10 in the power-OFF operation mode 2.

Likewise, upon receiving an <Active Source> command from an apparatus other than the DVD recorder 20, the DVD recorder 20 determines that another apparatus is in an active source state. The DVD recorder 20 accordingly deletes the information that the DVD recorder 20 is in an active source state from the active source state storage unit 208, and transitions to a power-OFF state (Step S114).

In Step S114, the microcomputer 210 in the DVD recorder 20 references the operation function setting storage unit 221. When the apparatus (the DVD recorder 20) is in the operation mode 1, the microcomputer 210 ends an unnecessary function so as to operate only a function that is operational in a power-ON state of the TV 10 in the power-OFF operation mode 1. When the apparatus is in the operation mode 2, the microcomputer 210 ends an unnecessary function so as to operate only a function that is operational in a power-ON state of the TV 10 in the power-OFF operation mode 2.

When the user presses an input selection button of the TV 10, the TV 10 transmits a <Set Stream Path> command having, as a parameter, a PA of an apparatus connected to a designated input.

In the case, the DVD recorder 20 or the set-top box 30 is powered ON and transmits an <Active Source> command, when the PA shown by the parameter in the <Set Stream Path> command is the same as a PA of the apparatus. The DVD recorder 20 or the set-top box 30 then starts outputting video and audio data, and also stores information that the apparatus is in an active source state, in the active source state storage unit 208 or 308.

Note that, after the DVD recorder 20 or the set-top box 30 is powered OFF as a result of receiving an <Active Source> command, if no operation is performed on the apparatus for a predetermined time period through any of the remote control 40, a button on a cabinet of the set-top box 30, CEC, and the like, it can be assumed that the user's operation on the apparatus does not occur. In such a case, the DVD recorder 20 or the set-top box 30 references the operation function setting storage unit 221 or 321, and transitions to a power-OFF state where an unnecessary function is further ended by operating only a function that is operational in a power-OFF state of the TV 10 in the operation mode 1 or the operation mode 2. This is described below, with reference to FIG. 9.

Suppose, after Step S114, to view a broadcast by the tuner 120 in the TV 10, the user performs selection by selecting an OSD menu displayed on the TV 10 or pressing a button on the remote control 40 of the TV 10, as shown in FIG. 9 (Step S115).

In this case, the TV 10 transmits an <Active Source> command to the DVD recorder 20 and the set-top box 30 (Steps S116, S117).

Upon receiving the <Active Source> command transmitted in Step S116, the set-top box 30 determines that another apparatus is in an active source state. The set-top box 30 accordingly deletes the information that the set-top box 30 is in an active source state from the active source state storage unit 308, and transitions to a power-OFF state (power-OFF operation mode 1).

Here, the DVD recorder 20 also receives the <Active Source> command transmitted in Step S117, but performs no operation in response to this command because the DVD recorder 20 has already transitioned to a power-OFF state (power-OFF operation mode 1) in Step S114.

In the case where, while the user continues viewing the broadcast by the tuner 120 in the TV 10, no operation is performed on the DVD recorder 20 and the set-top box 30 for the predetermined time period after the DVD recorder 20 and the set-top box 30 are powered OFF, the DVD recorder 20 and the set-top box 30 switch the operation mode in a power-OFF state from the operation mode 1 (power-OFF operation mode 1) to the operation mode 2 (power-OFF operation mode 2).

Here, the DVD recorder 20 and the set-top box 30 in a power-OFF state have at least two operation modes that differ in electricity consumption, namely, the power-OFF operation mode 1 and the power-OFF operation mode 2. As shown in FIG. 5, the power-OFF operation mode 2 has fewer operational functions than the power-OFF operation mode 1, and so has lower electricity consumption than the power-OFF operation mode 1.

Therefore, in the DVD recorder 20 and the set-top box 30, the number of operational functions when the TV 10 is powered OFF can be reduced as compared with the number of operational functions when the TV 10 is powered ON. Moreover, in the case where no operation is performed on the DVD recorder 20 and the set-top box 30 for the predetermined time period in a power-OFF state, the DVD recorder 20 and the set-top box 30 can be switched to a power-OFF state of lower electricity consumption, on an assumption that there is no need to immediately power ON the DVD recorder 20 and the set-top box 30. This further contributes to lower electricity consumption, so that a reduction in electricity consumption can be achieved.

Note that, in the case where there is no operation even when the predetermined time period has elapsed as mentioned above, the TV 10 which serves as a master apparatus for the DVD recorder 20 and the set-top box 30 may make the assumption that there is no need to immediately power ON. For example, when there is no operation on the TV 10 for the predetermined time period while the user continues viewing the broadcast by the tuner 120 in the TV 10, the TV 10 transmits a control command for controlling another apparatus, to the DVD recorder 20 and the set-top box 30. In this case, the DVD recorder 20 and the set-top box 30 switch to a power-OFF state of lower electricity consumption, on the basis of the received control command.

Moreover, the DVD recorder 20 and the set-top box 30 do not need to be immediately powered OFF upon receiving the <Active Source> command, and may instead be powered OFF when no operation is performed for a fixed time period after the reception.

In the above way, the DVD recorder 20 and the set-top box 30 can each be powered OFF according to the user's viewing operation. By ending an unnecessary function when the user is not viewing the apparatus, it is possible to reduce electricity consumption.

(Electricity Consumption Amount Recording)

The TV 10, the DVD recorder 20, and the set-top box 30 each record an amount of electricity consumption, i.e., an amount of electrical power consumed in the apparatus, and an amount of saved electricity consumption achieved as a result of a change in operation state caused by the operation mode switching timer.

In addition, in each of the TV 10, the DVD recorder 20, and the set-top box 30, a correspondence table of each operation state and electricity consumption of the apparatus in the operation state is stored in the electricity consumption storage unit (104, 204, and 304) beforehand. Note that, when there is no significant difference in electricity consumption between operational function combinations, such combinations may be shown together as one state.

The following describes a process whereby the TV 10 obtains an amount of electricity consumption and an amount of saved electricity consumption, taking the DVD recorder 20 as an example.

Figures 10, 11:
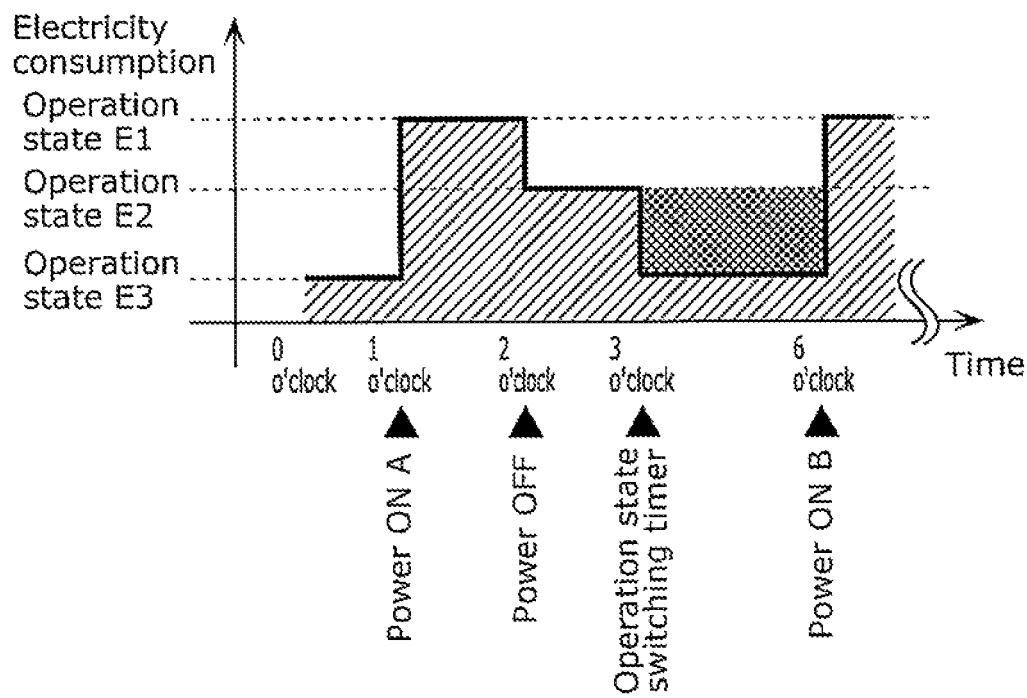
FIG. 10 is a diagram showing an example of correspondence of operation states and electricity consumption in the DVD recorder 20 in the first embodiment of the present invention.
FIG. 11 is a diagram showing an example of changes in operation and electricity consumption of the DVD recorder 20 in the first embodiment of the present invention.

FIG. 10 is a diagram showing an example of a correspondence table of each operation state and electricity consumption in the DVD recorder 20. In FIG. 10, electricity consumption is 40 W in an operation state E1, 10 W in an operation state E2, and 0.5 W in an operation state E3 in the DVD recorder 20.

When the DVD recorder 20 changes in operation state as a result of the user's operation of the input unit (not shown), the CEC command reception, or the operation of the timer in the DVD recorder 20 such as the recording timer 217 or the operation mode switching timer 201, the DVD recorder 20 stores a start time of the operation state and information showing the operation state in the operation state storage unit 222.

In the case where the change of the operation state is caused by the operation mode switching timer 201, the DVD recorder 20 also stores a flag showing that the state change is caused by the operation mode switching timer 201, in the operation state storage unit 222.

After this, when the DVD recorder 20 changes in operation state, the DVD recorder 20 calculates an amount of electricity consumption and an amount of saved electricity consumption in the operation state before the change. This is described in detail below.

First, the DVD recorder 20 references the operation state storage unit 222, and calculates a difference between the start time of the operation state and the current time as a duration of the operation state.

Next, the DVD recorder 20 references the operation state before the change in the operation state storage unit 222, and obtains electricity consumption in the operation state with reference to the electricity consumption storage unit 204.

The DVD recorder 20 then calculates a product of the duration of the operation state and the electricity consumption in the operation state, as the amount of electricity consumption in the operation state. The DVD recorder 20 stores the amount of electricity consumption, by adding the amount of electricity consumption to a value stored in the current-day storage unit in the electricity consumption amount storage unit 202. The DVD recorder 20 also stores the current time and the operation state after the change, in the operation state storage unit 222.

In the same manner, when the DVD recorder 20 changes in operation state again, an amount of electricity consumption is calculated from a product of a duration of the operation state and electricity consumption, and the amount of electricity consumption is stored by being added to the value stored in the current-day storage unit in the electricity consumption amount storage unit 202. The above series of operations is repeated in this way.

Moreover, the DVD recorder 20 references the operation state storage unit 222 and, when the state change is caused by the operation mode switching timer 201, calculates the amount of saved electricity consumption. The amount of saved electricity consumption is calculated by the following procedure.

The DVD recorder 20 calculates a difference between the electricity consumption in the operation state stored in the operation state storage unit 222 and electricity consumption in a normal state. The DVD recorder 20 then calculates a product of the electricity consumption difference and the duration of the operation state, as the amount of saved electricity consumption.

Here, the electricity consumption in the normal state is electricity consumption in an operation state in the case of not setting the operation mode switching timer 201. Accordingly, the amount of saved electricity consumption indicates an amount of electricity consumption reduced by the operation of the operation mode switching timer 201. The amount of saved electricity consumption is stored by being added to a value in the current-day storage unit in the saved electricity consumption amount storage unit 203, in the same way as the amount of electricity consumption.

Furthermore, the electricity consumption amount storage unit 202 stores a pair of a value corresponding to the current day and a recording date and time in the log recording unit in the electricity consumption amount storage unit 202, at regular time intervals such as 24-hour intervals. The electricity consumption amount storage unit 202 also resets the value in the current-day storage unit in the electricity consumption amount storage unit 202 to 0.

Likewise, the saved electricity consumption amount storage unit 203 stores a pair of a value corresponding to the current day and a recording date and time in the log recording unit in the saved electricity consumption amount storage unit 203, at regular time intervals such as 24-hour intervals. The saved electricity consumption amount storage unit 203 also resets the value in the current-day storage unit in the saved electricity consumption amount storage unit 203 to 0.

Note that the time intervals of recording a log of the amount of electricity consumption and the amount of saved electricity consumption are not limited to 24-hour intervals, so long as they are regular time intervals.

Each log recording unit records, for example, a log corresponding to 30 days, and deletes the log in order of occurrence when 30 days are exceeded.

In addition to the above-mentioned operations, the DVD recorder 20 stores, together with the current time, information that there is no change in operation state of the DVD recorder 20, in the operation duration time storage unit in the operation state storage unit 222 at predetermined time intervals.

There is the case where power supply to the DVD recorder 20 is stopped by, for example, the user removing a power cable of the DVD recorder 20 from a receptacle. When this occurs, upon receiving power supply again, the DVD recorder 20 starts operation, and also obtains the operation state, the start time of the operation state, and the duration time of the operation state with reference to the operation state storage unit 222. The DVD recorder 20 calculates a difference between the start time of the operation state and the duration time of the operation state, and stores a product of the difference and the electricity consumption in the operation state by adding the product to the value in the current-day storage unit in the electricity consumption amount storage unit 202.

FIG. 11 shows an example of changes in operation and electricity consumption of the DVD recorder 20. The following describes an example of storing the amount of electricity consumption and the amount of saved electricity consumption, with reference to FIG. 11. In FIG. 11, a horizontal axis represents a time, and a vertical axis represents electricity consumption at the time.

First, when the DVD recorder 20 is connected to the receptacle (not shown) and starts operation in the operation state E3 at 0 o'clock, information that the operation state E3 starts at 0 o'clock is stored in the operation state storage unit 222.

Following this, the user powers ON the DVD recorder 20 at 1 o'clock ("power ON A" in FIG. 11). Since a duration of the operation state E3 is 1 hour from 0 o'clock to 1 o'clock, 0.5 W (the electricity consumption of the operation state E3)×1 hour=0.5 Wh is stored in the current-day storage unit in the electricity consumption amount storage unit 202. Meanwhile, as a result of changing to the operation state E1, information that the operation state E1 starts at 1 o'clock is stored in the operation state storage unit 222.

Next, the user powers OFF the DVD recorder 20 at 2 o'clock ("power OFF" in FIG. 11). Since a duration of the operation state E1 is 1 hour from 1 o'clock to 2 o'clock, 40 W (the electricity consumption of the operation state E1)×1 hour=40 Wh is stored in the current-day storage unit in the electricity consumption amount storage unit 202. This yields 40.5 Wh as the amount of electricity consumption of the current day. Meanwhile, information that the operation state E2 starts at 2 o'clock is stored in the operation state storage unit 222.

Next, the operation mode switching timer 201 operates to change to the operation state E3 at 3 o'clock ("operation state switching timer" in FIG. 11). Since a duration of the operation state E2 is 1 hour from 2 o'clock to 3 o'clock, 10 W (the electricity consumption of the operation state E2)×1 hour=10 Wh is stored in the current-day storage unit in the electricity consumption amount storage unit 202. This yields 50.5 Wh as the amount of electricity consumption of the current day. Meanwhile, information that the operation state E3 starts at 3 o'clock and the change of the operation state is caused by the operation mode switching timer 201 is stored in the operation state storage unit 222.

After this, the user powers ON the DVD recorder 20 at 6 o'clock, as a result of which the operation state changes to the operation state E1. Since a duration of the operation state E3 is from 3 o'clock to 6 o'clock, 0.5 W (the electricity consumption of the operation state E3)×3 hours=1.5 Wh is stored in the current-day storage unit in the electricity consumption amount storage unit 202. This yields 52 Wh as the amount of electricity consumption of the current day.

Moreover, since the change to the operation state E3 is caused by the operation mode switching timer 201, the amount of saved electricity consumption is calculated. The DVD recorder 20 is changed to the operation state E3 by the operation mode switching timer 201, instead of the operation state E2 which is a normal operation state when the user powers OFF the DVD recorder 20. Accordingly, 9.5 W (the difference between the electricity consumption of the operation state E2 and the electricity consumption of the operation state E3)×3 hours=28.5 Wh is stored in the current-day storage unit in the saved electricity consumption amount storage unit 203. Meanwhile, information that the operation state E1 starts at 6 o'clock is stored in the operation state storage unit 222.

Thus, the DVD recorder 20 can calculate the amount of electricity consumption and the amount of saved electricity consumption.

In the same manner, the TV 10 and the set-top box 30 can obtain the amount of electricity consumption and the amount of saved electricity consumption, respectively using the operation state storage units 122 and 322, the electricity consumption storage units 104 and 304, the electricity consumption amount storage units 102 and 302, and the saved electricity consumption amount storage units 103 and 303.

(Electricity Consumption Amount Display by the TV 10)

The following describes the case where the user operates the remote control 40 of the TV 10 or a menu of the TV 10 to display an amount of electricity consumption and an amount of saved electricity consumption.

First, the TV 10 transmits an electricity consumption amount request command requesting electricity consumption amount information and a saved electricity consumption amount request command requesting saved electricity consumption amount information, to a connected apparatus.

The DVD recorder 20 and the set-top box 30 receive the electricity consumption amount request command. The DVD recorder 20 and the set-top box 30 respectively reference information in the log recording units in the electricity consumption amount storage units 202 and 302, and transmit an electricity consumption amount notification command having, as a parameter, a pair of an amount of electricity consumption and a recording date and time, to the TV 10.

The DVD recorder 20 and the set-top box 30 also receive the saved electricity consumption amount request command. The DVD recorder 20 and the set-top box 30 respectively reference information in the log recording units in the saved electricity consumption amount storage units 203 and 303, and transmit a saved electricity consumption amount notification command having, as a parameter, a pair of an amount of saved electricity consumption and a recording date and time, to the TV 10.

Having received the electricity consumption amount notification command from each of the DVD recorder 20 and the set-top box 30, the TV 10 calculates a total amount of electricity consumption of the apparatuses, and displays the amount of electricity consumption on a daily basis.

Figure 12:
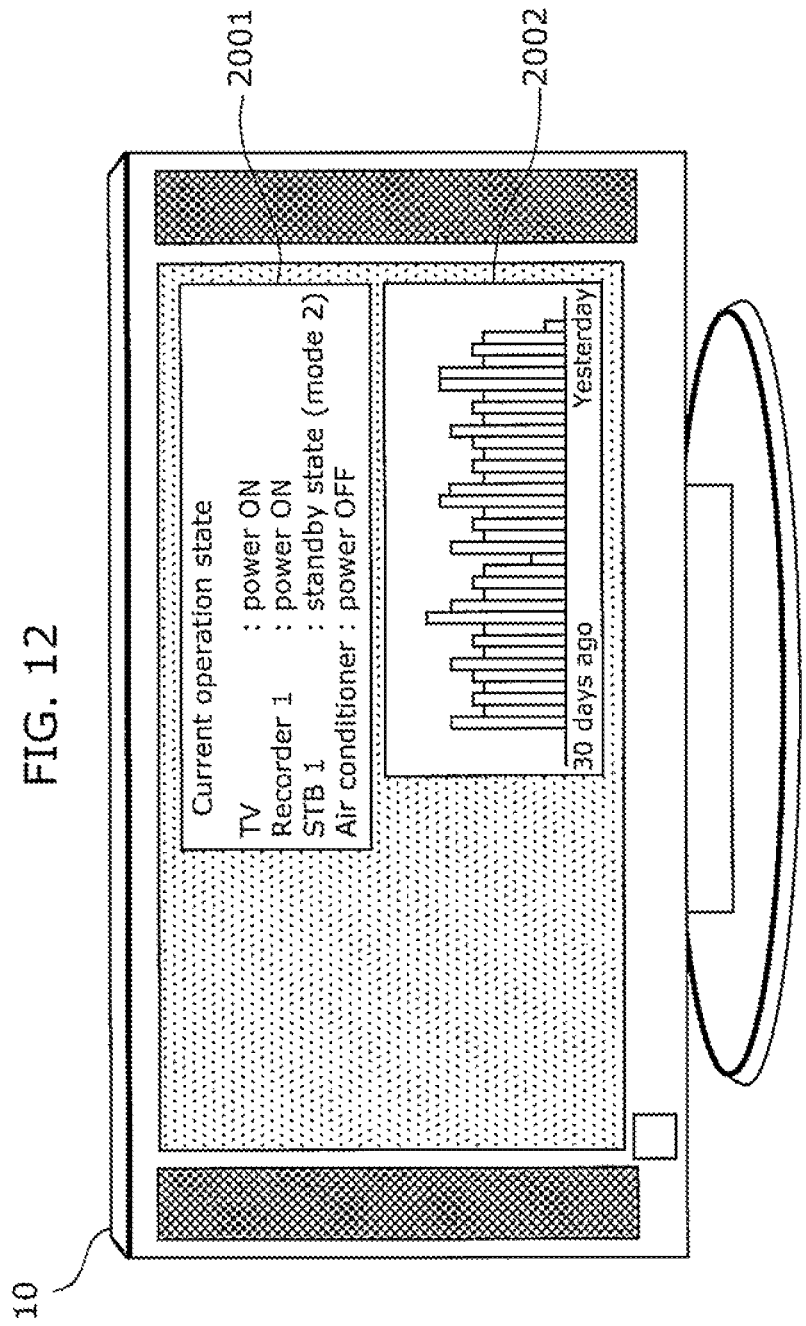
FIG. 12 is a diagram showing an example of displaying an operation state of each apparatus and a total amount of electricity consumption in the AV system, in the TV 10 in the first embodiment of the present invention.

FIG. 12 shows an example of displaying, on the TV 10, an operation state of each apparatus and a total amount of electricity consumption of the AV system in the first embodiment of the present invention.

For example, as shown by an OSD display 2002 in FIG. 12, an amount of electricity consumption from 30 days ago up to 1 day ago can be displayed where a horizontal axis represents a time and a vertical axis represents an amount of electricity consumption.

Likewise, having received the saved electricity consumption amount notification command from each of the DVD recorder 20 and the set-top box 30, the TV 10 calculates a total amount of saved electricity consumption on a daily basis and displays it in the video output unit 106. Here, values stored in the electricity consumption amount storage unit 102 and the saved electricity consumption amount storage unit 103 in the TV 10 may be added respectively to the displayed amount of electricity consumption and amount of saved electricity consumption.

Note that the display of each of the amount of electricity consumption and the amount of saved electricity consumption may be performed by displaying the number of icons proportional to the amount.

Moreover, the amount of electricity consumption and the amount of saved electricity consumption may be OSD-displayed when the user powers ON the TV 10 and the TV 10 starts video output.

Thus, the amount of electricity consumption and the amount of saved electricity consumption of the TV 10, the DVD recorder 20, and the set-top box 30 can be displayed to the user.

As described above, according to the first embodiment, a master apparatus (the TV 10 in this embodiment) transmits a control command for controlling an apparatus other than the master apparatus to the other apparatus, thereby enabling the other apparatus to switch its operation state on the basis of the received control command. This contributes to higher electricity consumption efficiency in the AV system.

Therefore, in the AV system where a plurality of apparatuses that each have a plurality of operation states of different electricity consumption are connected via a communication network such as HDMI, the plurality of operation states in the plurality of apparatuses can be controlled so as to improve electricity consumption efficiency in the AV system.

Second Embodiment

A second embodiment has the same structures and functions as the first embodiment described above, and so the same structures as the first embodiment are given the same reference numerals in the drawings and their description is omitted.

<Structure>

Figure 13:
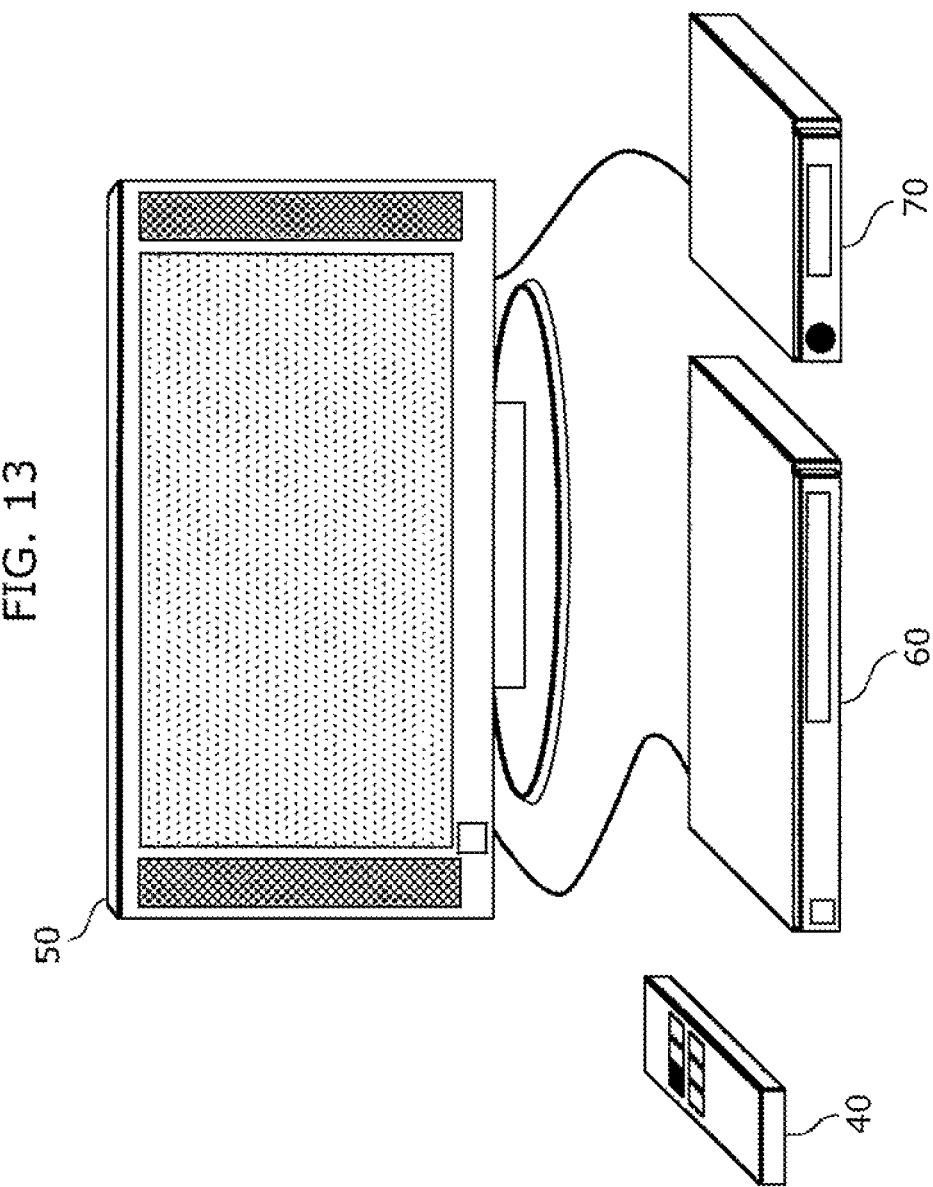
FIG. 13 is a structural diagram of an AV system in a second embodiment of the present invention.
Figure 14:
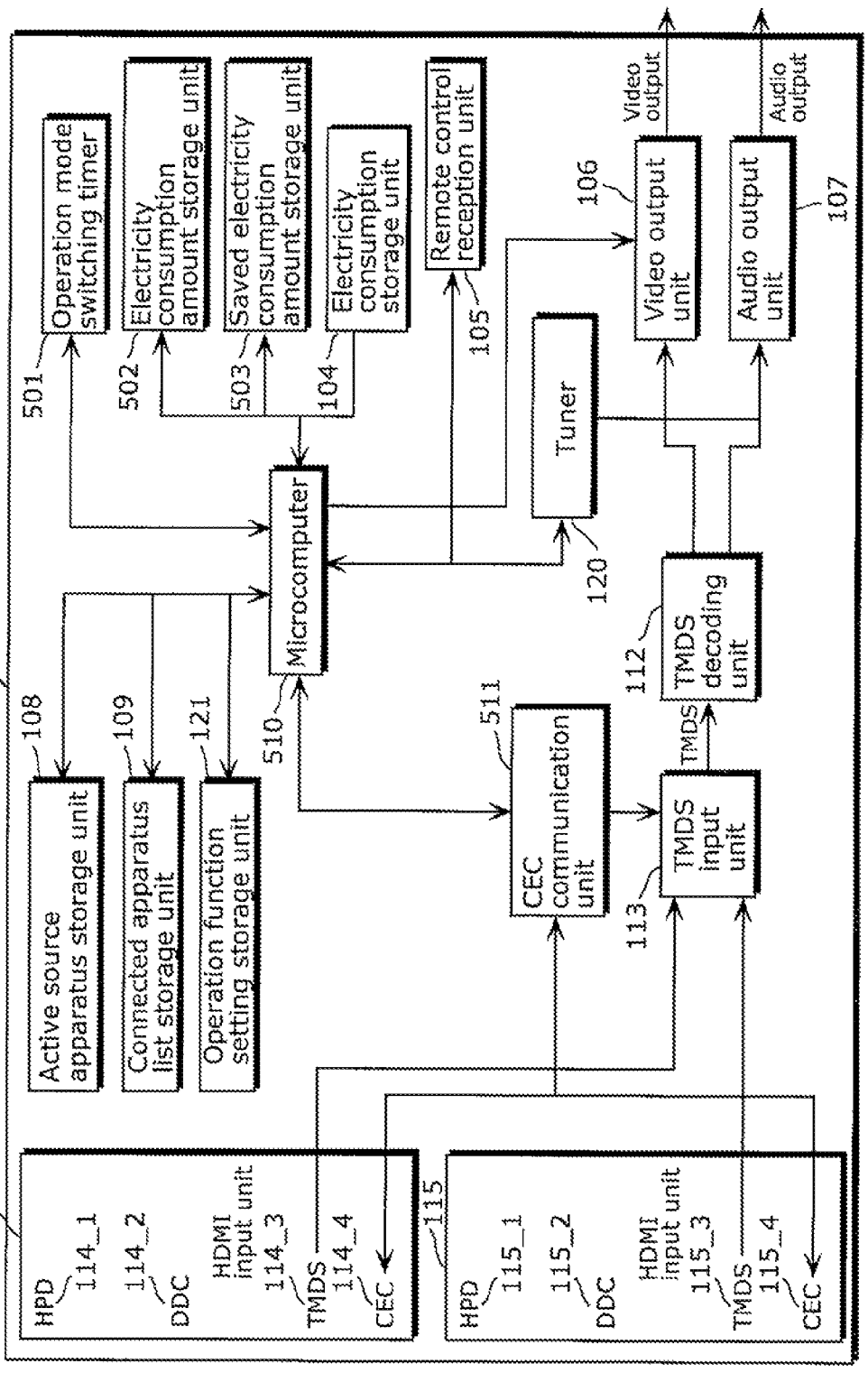
FIG. 14 is a functional block diagram of a TV 50 in the second embodiment of the present invention.
Figure 15:
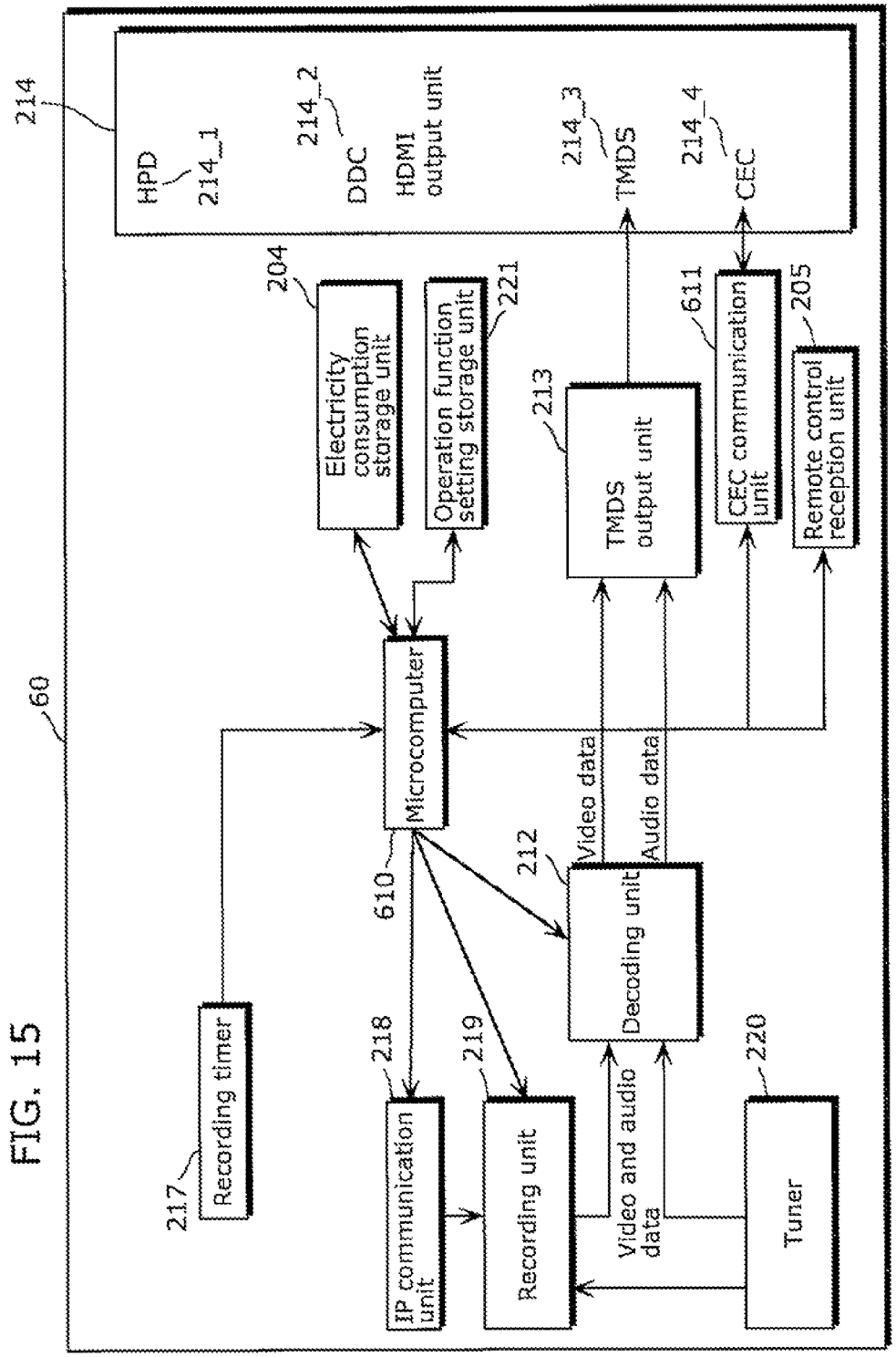
FIG. 15 is a functional block diagram of a DVD recorder 60 in the second embodiment of the present invention.
Figure 16:
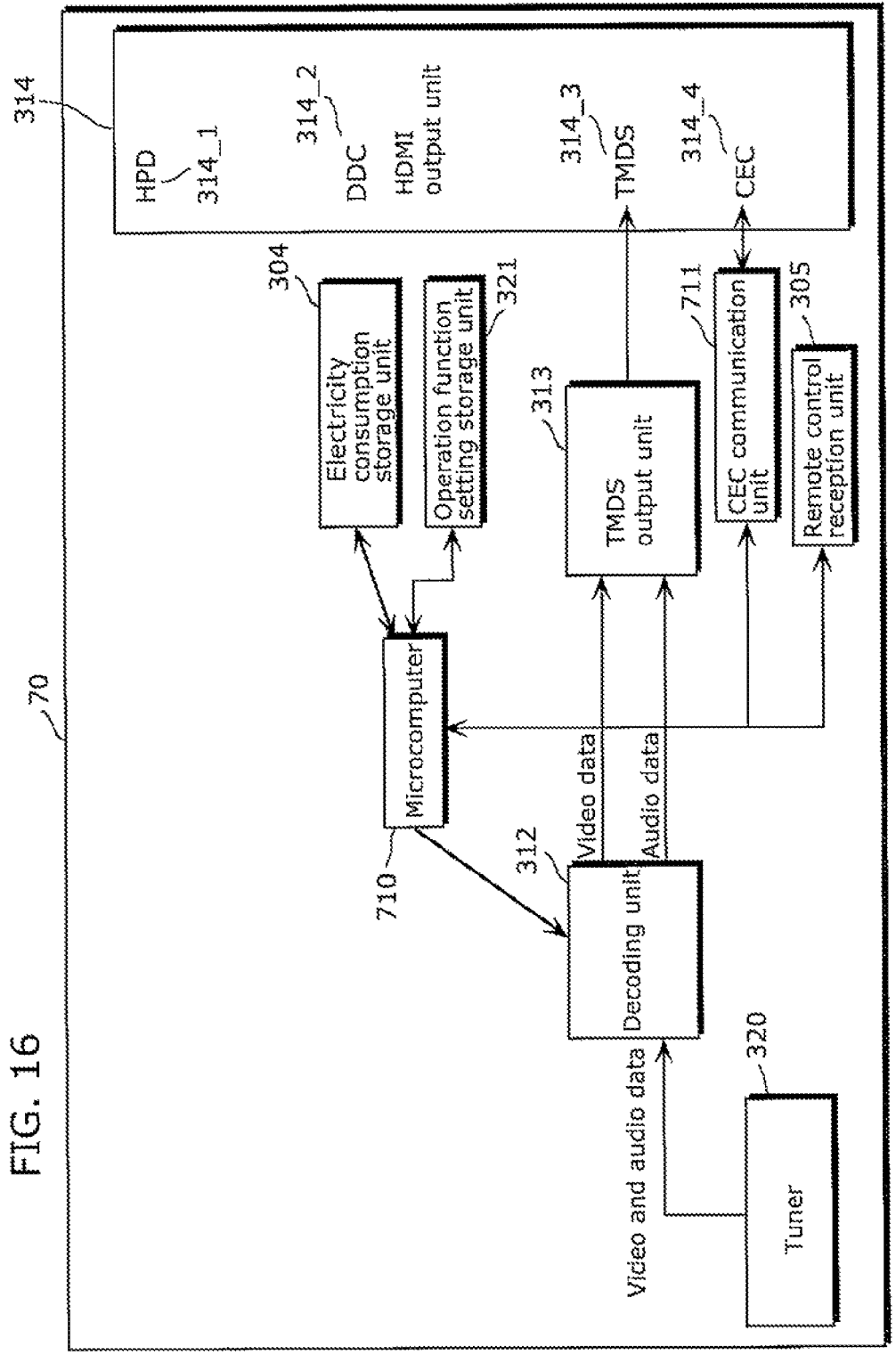
FIG. 16 is a functional block diagram of a set-top box 70 in the second embodiment of the present invention.

FIG. 13 is a diagram schematically showing a structure of an AV system in the second embodiment. FIG. 14 is a functional block diagram of a TV 50 in the second embodiment. FIG. 15 is a functional block diagram of a DVD recorder 60 in the second embodiment. FIG. 16 is a functional block diagram of a set-top box 70 in the second embodiment. Note that, in FIGS. 14, 15, and 16, the same components as those in FIGS. 2, 3, and 4 are given the same reference numerals and their detailed description is omitted here.

The TV 50 in the second embodiment is an example of the first apparatus according to the present invention, and the DVD recorder 60 and the set-top box 70 in the second embodiment are each an example of the second apparatus according to the present invention.

As shown in FIG. 13, the AV system in the second embodiment includes the TV 50, the DVD recorder 60, and the set-top box 70. The AV system also includes, for example, the remote control 40.

In the AV system, the DVD recorder 60 and the set-top box 70 are connected to the TV 50 via HDMI cables. CEC lines in HDMI are connected in a CEC communication unit 511 in the TV 50. The TV 50, the DVD recorder 60, and the set-top box 70 are capable of performing transmission and reception of a CEC command as a control command with each other.

The TV 50 is an apparatus that outputs video and audio outputted from an apparatus connected via a HDMI cable, and a broadcast signal received via an antenna (not shown).

The TV 50 includes an operation mode switching timer 501, an electricity consumption amount storage unit 502, a saved electricity consumption amount storage unit 503, the electricity consumption storage unit 104, the remote control reception unit 105, the video output unit 106, the audio output unit 107, the active source apparatus storage unit 108, the connected apparatus list storage unit 109, a microcomputer 510, the CEC communication unit 511, the TMDS decoding unit 112, the TMDS input unit 113, the HDMI input units 114 and 115, the tuner 120, and the operation function setting storage unit 121.

The operation mode switching timer 501 includes a timer and an operation mode switching time storage unit.

The operation mode switching timer 501 stores the time 1 to switch to the operation mode 1 and the time 2 to switch to the operation mode 2, via the microcomputer 510. When the time 1 or the time 2 is reached, the operation mode switching timer 501 notifies the microcomputer 510 that the corresponding set time is reached.

The electricity consumption amount storage unit 502 includes a current-day storage unit that temporarily stores an amount of electricity consumption of a current day, and a log recording unit that stores an amount of electricity consumption of a past fixed time period. In the electricity consumption amount storage unit 502, the current-day storage unit and the log recording unit are connected via CEC, and perform recording for each apparatus that differs in LA and PA. Note that the log recording unit in the electricity consumption amount storage unit 502 is composed of a nonvolatile storage device.

The saved electricity consumption amount storage unit 503 includes a current-day storage unit that temporarily stores an amount of saved electricity consumption of the current day, and a log recording unit that stores an amount of saved electricity consumption of the past fixed time period. In the saved electricity consumption amount storage unit 503, the current-day storage unit and the log recording unit are connected by CEC, and perform recording for each apparatus that differs in LA and PA. Note that the log recording unit in the saved electricity consumption amount storage unit 503 is composed of a nonvolatile storage device.

The DVD recorder 60 is an apparatus that records a broadcast signal received via an antenna (not shown), and outputs a recorded video and audio signal via a HDMI cable. As shown in FIG. 15, the DVD recorder 60 includes the electricity consumption storage unit 204, the remote control reception unit 205, a microcomputer 610, a CEC communication unit 611, the decoding unit 212, the TMDS output unit 213, the HDMI output unit 214, the recording timer 217, the IP communication unit 218, the recording unit 219, the tuner 220, and the operation function setting storage unit 221.

The set-top box 70 is an apparatus that decodes a broadcast signal received via a broadcast signal cable (not shown), and outputs a video and audio signal via a HDMI cable. As shown in FIG. 16, the set-top box 70 includes the electricity consumption storage unit 304, the remote control reception unit 305, a microcomputer 710, a CEC communication unit 711, the decoding unit 312, the TMDS output unit 313, the HDMI output unit 314, the tuner 320, and the operation function setting storage unit 321.

<Operation>

Operations of the TV 50, the DVD recorder 60, and the set-top box 70 in the second embodiment are described in detail below.

(Operation Mode Switching According to Time)

First, the user designates the time 1 to start operation in the power-ON operation mode 1 and the power-OFF operation mode 1 and the time 2 to start operation in the power-ON operation mode 2 and the power-OFF operation mode 2, through the input unit of the TV 50 beforehand. The TV 50 stores the time 1 and time 2.

When the time 2 designated by the user beforehand is reached, the operation mode switching timer 501 in the TV 50 notifies the microcomputer 510 that the time 2 is reached.

The microcomputer 510 receives the notification, and controls the CEC communication unit 511 to transmit an operation mode switching command 2 instructing to switch from the operation mode 1 to the operation mode 2.

The DVD recorder 60 and the set-top box 70 each receive the operation mode switching command and, when the operation mode of the apparatus is the power-ON operation mode 1, switch the operation mode to the power-ON operation mode 2. When the operation mode of the apparatus is the power-OFF operation mode 1, on the other hand, the DVD recorder 60 and the set-top box 70 each switch the operation mode to the power-OFF operation mode 2.

Upon switching the operation mode, the DVD recorder 60 references the operation function setting storage unit 221 in the DVD recorder 60. For a function that is set to be non-operational in the switched operation mode, the DVD recorder 60 ends a corresponding program or does not energize the function. For a function that is set to be operational in the switched operation mode, the DVD recorder 60 starts a corresponding program or energizes the function.

Upon switching the operation mode, the set-top box 70 references the operation function setting storage unit 321 in the set-top box 70, in the same manner as the DVD recorder 60. For a function that is set to be non-operational in the switched operation mode, the set-top box 70 ends a corresponding program or does not energize the function. For a function that is set to be operational in the switched operation mode, the set-top box 70 starts a corresponding program or energizes the function.

Moreover, when the operation mode of the TV 50 is the power-ON operation mode 1, the TV 50 switches the operation mode to the power-ON operation mode 2. When the operation mode of the TV 50 is the power-OFF operation mode 1, on the other hand, the TV 50 switches the operation mode to the power-OFF operation mode 2. The TV 50 then starts operation.

Subsequently, when the time 1 designated by the user beforehand is reached, the operation mode switching timer 501 in the TV 50 notifies the microcomputer 510 that the time 1 is reached. The microcomputer 510 receives the notification, and controls the CEC communication unit 511 to transmit an operation mode switching command 1 instructing to switch from the operation mode 2 to the operation mode 1.

The DVD recorder 60 and the set-top box 70 each receive the operation mode switching command and, when the operation mode of the apparatus is the power-ON operation mode 2, switch the operation mode to the power-ON operation mode 1. When the operation mode of the apparatus is the power-OFF operation mode 2, on the other hand, the DVD recorder 60 and the set-top box 70 each switch the operation mode to the power-OFF operation mode 1.

Upon switching the operation mode, the DVD recorder 60 references the operation function setting storage unit 221 in the DVD recorder 60. For a function that is set to be non-operational in the switched operation mode, the DVD recorder 60 ends a corresponding program or does not energize the function. For a function that is set to be operational in the switched operation mode, the DVD recorder 60 starts a corresponding program or energizes the function.

Upon switching the operation mode, the set-top box 70 references the operation function setting storage unit 321 in the set-top box 70, in the same manner as the DVD recorder 60. For a function that is set to be non-operational in the switched operation mode, the set-top box 70 ends a corresponding program or does not energize the function. For a function that is set to be operational in the switched operation mode, the set-top box 70 starts a corresponding program or energizes the function.

Moreover, when the operation mode of the TV 50 is the power-ON operation mode 2, the TV 50 switches the operation mode to the power-ON operation mode 1. When the operation mode of the TV 50 is the power-OFF operation mode 2, on the other hand, the TV 50 switches the operation mode to the power-OFF operation mode 1.

Note that, when the TV 50 is in a power-ON state, the TV 50 does not need to transmit the operation mode switching command. However, in the case where the TV 50 is powered OFF in a period during which the TV 50 is set to operate in the operation mode 2, that is, a period from the time 2 to the next time 1, the TV 50 transmits a <Standby> command for powering OFF and also transmits the operation mode switching command 2.

Moreover, when a function of a high priority is operating in the DVD recorder 60 or the set-top box 70 as in the case where, for example, a TV program is being recorded, the DVD recorder 60 or the set-top box 70 buffers the operation mode switching command in the CEC communication unit 611 or 711 and, upon completion of the operation of the function, executes the operation mode switching command.

Thus, the TV 50, the DVD recorder 60, and the set-top box 70 can switch the operation mode according to the time or time period designated by the user beforehand, through the use of the operation mode switching timer 501.

(Operation Mode Switching in Synchronization with Power ON/OFF)

The TV 50, the DVD recorder 60, and the set-top box 70 can also switch to the operation mode 1 or the operation mode 2 in synchronization with the user's operation on the TV 50, without depending on the operation mode switching timer 501 mentioned above. This is described below.

Suppose the user presses an operation mode switching button (not shown) on the remote control 40 of the TV 50 or the cabinet of the TV 50, when the TV 50 is operating in the operation mode 2. In this case, the microcomputer 510 in the TV 50 controls the CEC communication unit 511 to transmit an operation mode switching command 3 instructing to switch to the operation mode 1, to the DVD recorder 60 and the set-top box 70.

The DVD recorder 60 and the set-top box 70 receive the operation mode switching command 3, switch their operation mode to the power-ON operation mode 1 or the power-OFF operation mode 1, and start operation.

Suppose the user presses the operation mode switching button (not shown) on the remote control 40 of the TV 50 or the cabinet of the TV 50, when the TV 50 is operating in the operation mode 1. In this case, the microcomputer 510 in the TV 50 controls the CEC communication unit 511 to transmit an operation mode switching command 4 instructing to switch to the operation mode 2, to the DVD recorder 60 and the set-top box 70 connected with the TV 50.

Note that, when the TV 50 switches from the operation mode 1 to the operation mode 2, the TV 50 may be powered OFF and transmit, together with the operation mode switching command 4, a <Standby> command for powering OFF an apparatus connected via CEC.

The DVD recorder 60 and the set-top box 70 receive the operation mode switching command 4, switch their operation mode to the power-ON operation mode 2 or the power-OFF operation mode 2, and start operation.

In the case where the TV 50 transmits the <Standby> command together with the operation mode switching command 4, the DVD recorder 60 and the set-top box 70 are powered OFF and switch to the power-OFF operation mode 2.

Thus, the TV 50, the DVD recorder 60, and the set-top box 70 can switch to the operation mode 1 or the operation mode 2 without depending on the operation mode switching timer 501.

Note that the operation performed by the user so that the TV 50 transmits the operation mode switching command 3 or the operation mode switching command 4 to switch the operation mode is not limited to the operation mode switching button on the remote control 40 of the TV 50. For example, a menu item for switching the operation mode may be provided in a menu of the TV 50 so that the operation mode is switched when the user selects the menu item.

Moreover, the TV 50 may be powered OFF and transmit the operation mode switching command when a predetermined time period has elapsed without the user's operation. Furthermore, the TV 50 may learn a tendency as to during which time of day the user operates the TV 50, and shorten the time period to the power OFF in a time of day during which the user does not tend to operate the TV 50. This allows for more electrical power saving.

(Operation Mode Switching According to User Operation)

The TV 50, the DVD recorder 60, and the set-top box 70 can also switch the operation mode in synchronization with the user's operation on the TV 50, without depending on the operation mode switching timer 501. Besides, even when the operation mode switching timer 501 has been set, it is possible to switch to the operation mode 3 only in accordance with the user's operation, without performing operation mode switching by the timer.

The following describes switching from the operation mode 1 or the operation mode 2 to the operation mode 3, and switching from the operation mode 3 to the operation mode 1 or the operation mode 2.

Suppose the user presses the operation mode switching button (not shown) on the remote control 40 of the TV 50 or the cabinet of the TV 50, when the TV 50 is operating in the operation mode 1 or the operation mode 2. In this case, the microcomputer 510 in the TV 50 controls the CEC communication unit 511 to transmit an operation mode switching command 5 instructing to switch to the operation mode 3, to the DVD recorder 60 and the set-top box 70 connected with the TV 50.

Note that, when the TV 50 switches from the operation mode 1 or the operation mode 2 to the operation mode 3, the TV 50 may be powered OFF and transmit, together with the operation mode switching command 5, a <Standby> command for powering OFF an apparatus connected via CEC.

The DVD recorder 60 and the set-top box 70 receive the operation mode switching command 5, and switch their operation mode to the power-OFF operation mode 3.

In the case where the TV 50 transmits the <Standby> command together with the operation mode switching command 5, the DVD recorder 60 and the set-top box 70 are powered OFF and switch to the operation mode 3.

Suppose the user presses the operation mode switching button (not shown) on the remote control 40 of the TV 50 or the cabinet of the TV 50, when the TV 50 is operating in the operation mode 3. In this case, the microcomputer 510 in the TV 50 controls the CEC communication unit 511 to transmit an operation mode switching command 6 instructing to clear the operation mode 3, to the DVD recorder 60 and the set-top box 70 connected with the TV 50.

Here, the TV 50 adds a parameter to the operation mode switching command 6 so as to switch to the operation mode 1 or the operation mode 2 after clearing the operation mode 3, and transmits the operation mode switching command 6. For example, in the case of transmitting the operation mode switching command 6 in a period from the time 1 to the time 2, the TV 50 adds the parameter so as to switch to the operation mode 1. In the case of transmitting the operation mode switching command 6 in a period from the time 2 to the next time 1, the TV 50 adds the parameter so as to switch to the operation mode 2.

The DVD recorder 60 and the set-top box 70 receive the operation mode switching command 6, switch their operation mode to the power-ON operation mode 1 or 2 or the power-OFF operation mode 1 or 2, and start operation.

Thus, the TV 50, the DVD recorder 60, and the set-top box 70 can switch from the operation mode 1 or the operation mode 2 to the operation mode 3 on the basis of the received control command, without depending on the operation mode switching timer 501.

Note that the operation performed by the user so that the TV 50 transmits the operation mode switching command 5 or the operation mode switching command 6 to switch the operation mode is not limited to the press of the operation mode switching button on the remote control 40 of the TV 50. For example, the operation mode may be switched when the user presses the power button on the remote control 40. Alternatively, a menu item for switching the operation mode may be provided in a menu of the TV 50 so that the operation mode is switched when the user selects the menu item. Moreover, the switching to the operation mode 3 may be performed when there is no user operation within a predetermined time period, such as 24 hours, after the user powers OFF the TV 50. Furthermore, the TV 50 may learn a tendency as to during which time of day the user operates the TV 50, and shorten the time period to switch to the operation mode 3 in a time of day during which the user does not tend to operate the TV 50.

Figure 17:
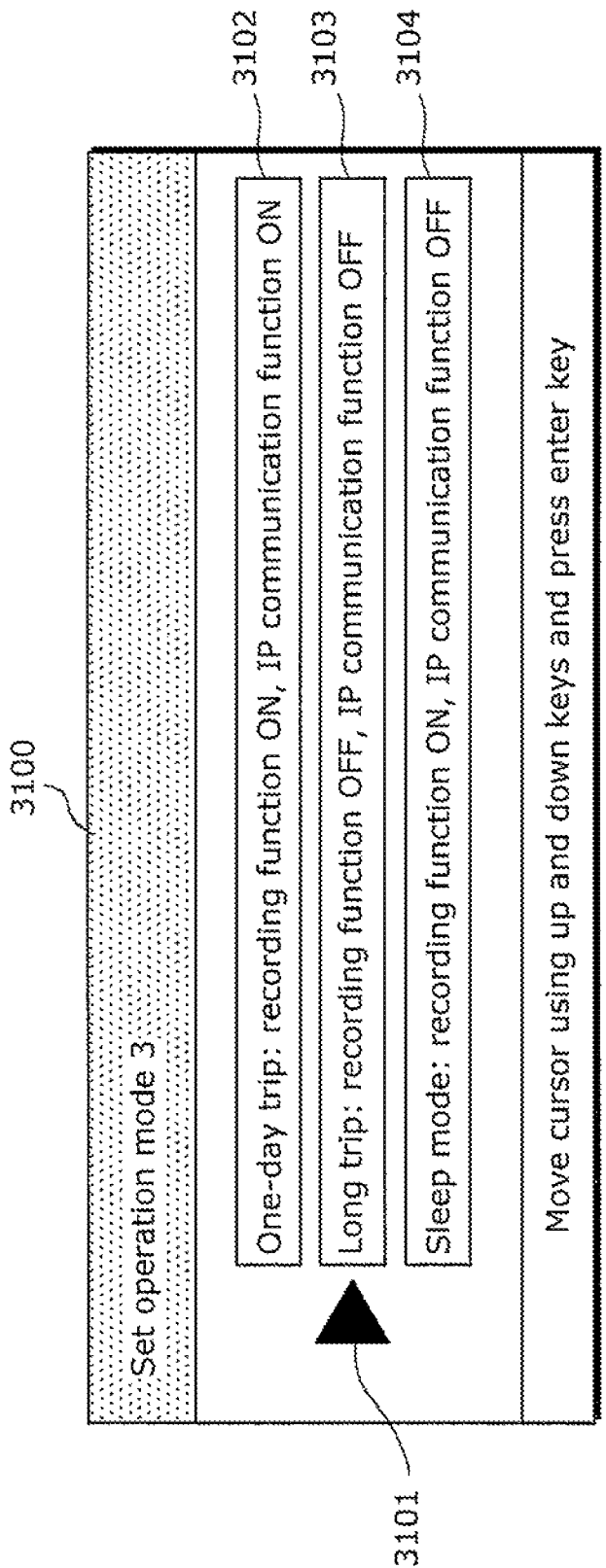
FIG. 17 is a diagram showing an example of an OSD menu for setting a function that is operational in an operation mode 3 and switching to the operation mode 3, in the TV 50 in the second embodiment of the present invention.

FIG. 17 shows an example of an OSD menu for setting a function that is operational in the operation mode 3 and switching to the operation mode 3 in the TV 50 according to the present invention.

For instance, the TV 50 displays a menu such as an OSD menu 3100 shown in FIG. 17. When the user selects a desired menu item, the CEC communication unit 511 in the TV 50 transmits an operation function setting update command that includes information for setting a function combination corresponding to the menu item to be operational in the operation mode 3, to the DVD recorder 60 and the set-top box 70. The CEC communication unit 511 also transmits the operation mode switching command 5 instructing to switch to the operation mode 3, to the DVD recorder 60 and the set-top box 70. Upon receiving the operation function setting update command, the DVD recorder 60 and the set-top box 70 update the operation function setting storage units 221 and 321 so that the function combination shown by the operation function setting update command is set as a function operational in the operation mode 3.

The DVD recorder 60 and the set-top box 70 also receive the operation mode switching command 5, switch to the operation mode 3, and start operation in the operation mode 3.

Thus, the TV 50, the DVD recorder 60, and the set-top box 70 can switch the operation mode in accordance with the user's operation.

(Operations of the DVD Recorder 60 and the Set-Top Box 70 when the TV 50 is in a Power-ON State)

When video and audio data outputted from the DVD recorder 60 cannot be reproduced in the TV 50 as in the case where the user is viewing video and audio from the set-top box 70 in the TV 50 in the operation mode 1 or the operation mode 2, the DVD recorder 60 is powered OFF.

Likewise, when video and audio data outputted from the set-top box 70 cannot be reproduced in the TV 50 as in the case where the input of the TV 50 is the DVD recorder 60, the set-top box 70 is powered OFF.

Figure 18:
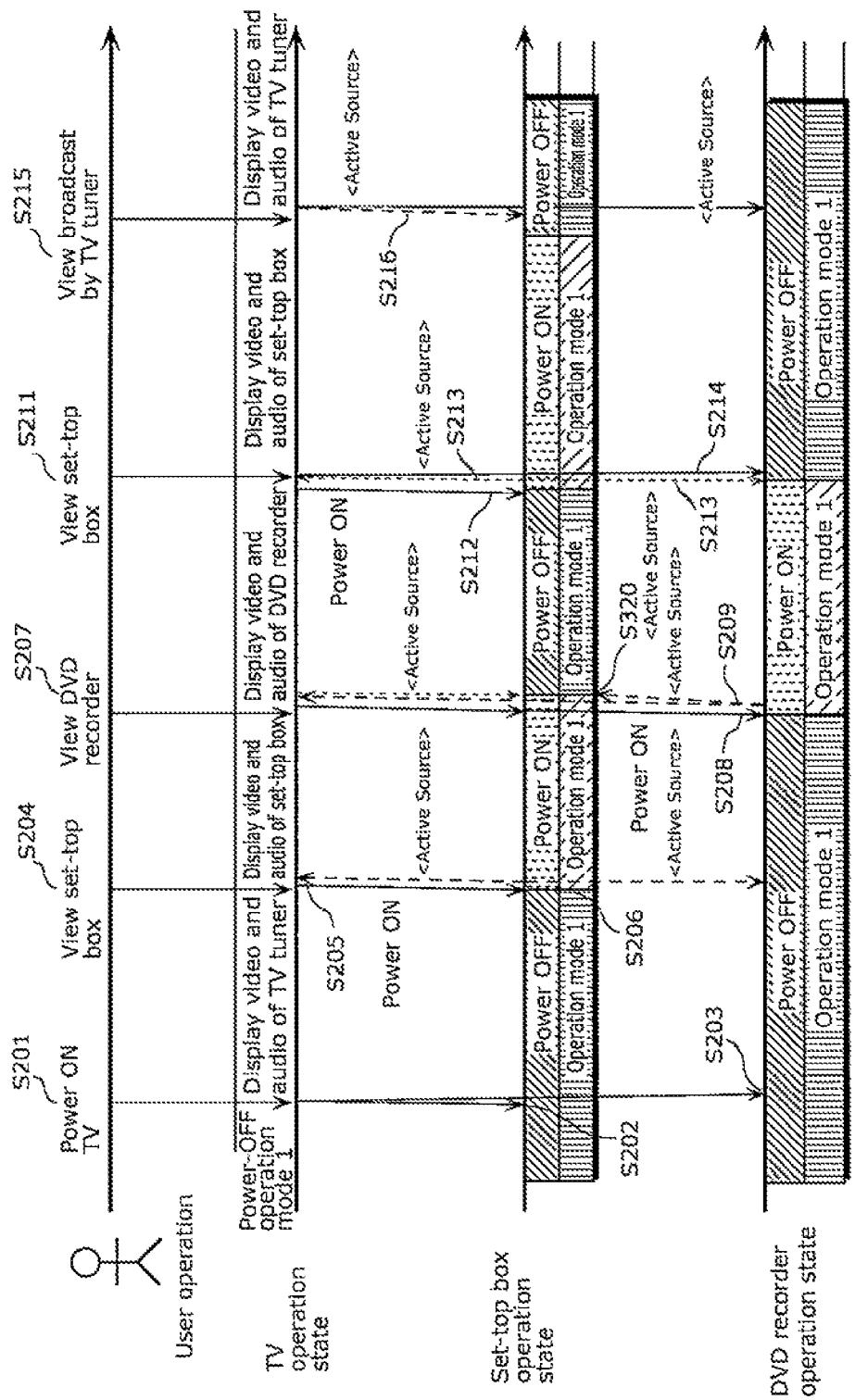
FIG. 18 is a diagram showing an example of a flow of CEC command transmission and reception when the DVD recorder 60 and the set-top box 70 operate according to a user operation in the second embodiment of the present invention.

FIG. 18 shows an example of a flow of CEC command transmission and reception when the DVD recorder 60 and the set-top box 70 operate according to the user's operation in the second embodiment of the present invention. The following describes a process whereby the DVD recorder 60 and the set-top box 70 are powered OFF according to the user's viewing operation of the TV 50, with reference to FIG. 18.

First, the user powers ON the TV 50 by performing an input operation through the input unit of the TV 50 such as the remote control 40 (Step S201).

After the TV 50 is powered ON, in the case of reproducing video and audio from the tuner 120 included in the TV 50, the TV 50 broadcasts an <Active Source> command to the DVD recorder 60 and the set-top box 70.

The TV 50 also transmits an activation notification command from the CEC communication unit 511 to the DVD recorder 60 and the set-top box 70.

The microcomputers 610 and 710 in the DVD recorder 60 and the set-top box 70 receive the activation notification command from the CEC communication units 611 and 711, and reference the operation function setting storage units 221 and 321, respectively. In each of the DVD recorder 60 and the set-top box 70, when the apparatus is in the operation mode 1, the microcomputer activates a function that is operational in a power-ON state of the TV 50 in the power-OFF operation mode 1. When the apparatus is in the operation mode 2, on the other hand, the microcomputer activates a function that is operational in a power-ON state of the TV 50 in the power-OFF operation mode 2.

Next, to start viewing the set-top box 70, the user performs selection by selecting a menu displayed on the TV 50 or pressing a button on the remote control 40 of the TV 50 (Step S204).

The TV 50 responsively transmits a power-ON command to the set-top box 70 (Step S205).

The set-top box 70 receives the power-ON command, transitions to a power-ON state, and starts outputting video and audio. When starting the video and audio output, the set-top box 70 transmits an <Active Source> command to the TV 50 and the DVD recorder 60.

Upon receiving the <Active Source> command, the TV 50 stores a LA and a PA of the transmitter of the command, in the active source apparatus storage unit 108 in the TV 50.

Next, to start viewing the DVD recorder 60, the user performs selection by selecting a menu displayed on the TV 50 or pressing a button on the remote control 40 of the TV 50 (Step S207).

The TV 50 responsively transmits a power-ON command to the DVD recorder 60 (Step S208).

The DVD recorder 60 receives the power-ON command, transitions to a power-ON state, and starts outputting video and audio. When starting the video and audio output, the DVD recorder 60 transmits an <Active Source> command to the TV 50 and the set-top box 70.

Upon receiving the <Active Source> command, the TV 50 references the active source apparatus storage unit 108 in the TV 50. When a PA of the transmitter of the received command does not match the PA in the active source apparatus storage unit 108, the TV 50 determines that the active source is changed. The TV 50 transmits a power-OFF command to the LA in the active source apparatus storage unit 108, that is, the set-top box 70 in this embodiment (Step S209).

The TV 50 also stores a LA and the PA of the transmitter of the <Active Source> command, in the active source apparatus storage unit 108.

The set-top box 70 receives the power-OFF command, and transitions to a power-OFF state. Here, in Step S209, the microcomputer 710 in the set-top box 70 references the operation function setting storage unit 321.

When the set-top box 70 is in the operation mode 1, the microcomputer 710 ends an unnecessary function so as to operate only a function that is operational in a power-ON state of the TV 50 in the power-OFF operation mode 1. When the set-top box 70 is in the operation mode 2, the microcomputer 710 ends an unnecessary function so as to operate only a function that is operational in a power-ON state of the TV 50 in the power-OFF operation mode 2.

Next, the user operates the remote control 40 of the set-top box 70 to start video and audio output. The set-top box 70 transmits an <Active Source> command from the CEC communication unit 711 to the TV 50 and the DVD recorder 60 (Step S213).

Upon receiving the <Active Source> command from the set-top box 70, the TV 50 references the active source apparatus storage unit 108. When the active source is changed, the TV 50 transmits a power-OFF command to the LA in the active source apparatus storage unit 108, that is, the DVD recorder 60 (Step S214).

The DVD recorder 60 receives the power-OFF command, and transitions to a power-OFF state.

Here, the microcomputer 610 in the DVD recorder 60 references the operation function setting storage unit 221. When the DVD recorder 60 is in the operation mode 1, the microcomputer 610 ends an unnecessary function so as to operate only a function that is operational in a power-ON state of the TV 50 in the power-OFF operation mode 1. When the DVD recorder 60 is in the operation mode 2, the microcomputer 610 ends an unnecessary function so as to operate only a function that is operational in a power-ON state of the TV 50 in the power-OFF operation mode 2.

Figure 19:
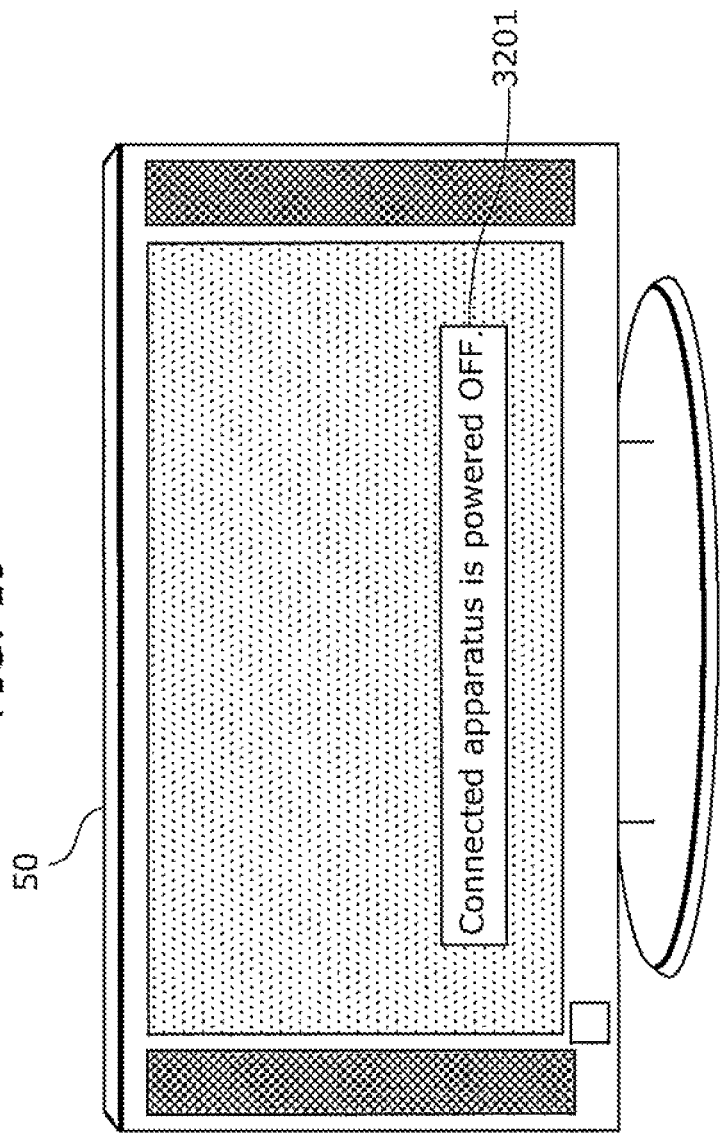
FIG. 19 is a diagram showing an example of an OSD display for notifying the user of power OFF, in the TV 50 in the second embodiment of the present invention.

Note that, when transmitting the power-OFF command, the TV 50 may notify the user that the connected apparatus is powered OFF. For example, when the user switches to the set-top box 70 while viewing the DVD recorder 60, the TV 50 transmits the power-OFF command to the DVD recorder 60, and also notifies the user that the DVD recorder 60 is powered OFF, through a display such as an OSD display 3201 shown in FIG. 19 in the video output device.

When the user presses an input selection button of the TV 50, the TV 50 transmits a <Set Stream Path> command having, as a parameter, a PA of an apparatus connected to a designated input.

In this case, the DVD recorder 60 or the set-top box 70 is powered ON and transmits an <Active Source> command, when the PA shown by the parameter in the <Set Stream Path> command is the same as the PA of the apparatus. The DVD recorder 60 or the set-top box 70 then starts outputting video and audio data.

Note that, when a function of a high priority is operating as in the case where, for example, a TV program is being recorded, the DVD recorder 60 or the set-top box 70 buffers the power-OFF command in the CEC communication unit 611 or 711 and, upon completion of the operation of the function, executes the power-OFF command.

In the above way, the DVD recorder 60 and the set-top box 70 can each be powered OFF according to the user's viewing operation on the TV 50. By ending an unnecessary function when the user is not viewing the apparatus, it is possible to reduce electricity consumption.

(Electricity Consumption Amount Recording)

The TV 50, the DVD recorder 60, and the set-top box 70 each record an amount of electricity consumption, i.e., an amount of electrical power consumed in the apparatus, and an amount of saved electricity consumption achieved as a result of a change in operation state caused by the operation mode switching timer.

In addition, in each of the TV 50, the DVD recorder 60, and the set-top box 70, a correspondence table of each operation state and electricity consumption of the apparatus in the operation state is stored in the electricity consumption storage unit (104, 204, and 304) beforehand. Note that, when there is no significant difference in electricity consumption between operational function combinations, such combinations may be shown together as one state.

The following describes a process whereby the TV 50 obtains an amount of electricity consumption and an amount of saved electricity consumption in the DVD recorder 60. Note that the correspondence of each operation state and electricity consumption in the DVD recorder 60 is the same as that in the DVD recorder 20 in the first embodiment.

First, the TV 50 transmits an operation state electricity consumption request command to the DVD recorder 60, at regular time intervals such as 1-hour intervals.

Upon receiving the operation state electricity consumption request command, the DVD recorder 60 references the electricity consumption storage unit 204 to obtain electricity consumption in a current operation state. The DVD recorder 60 transmits an operation state electricity consumption notification command having, as a parameter, information showing the current operation state and the current electricity consumption, to the TV 50.

The TV 50 receives the operation state electricity consumption notification command, and calculates a product of the electricity consumption of the DVD recorder 60 shown by the parameter in the operation state electricity consumption notification command and the transmission time interval of the operation state electricity consumption request command. The TV 50 adds the product to a value stored in the electricity consumption amount storage unit 502. In this way, the amount of electricity consumption of the DVD recorder 60 is stored in the electricity consumption amount storage unit 502.

Moreover, the TV 50 transmits an operation state saved electricity request command to the DVD recorder 60, at regular time intervals such as 1-hour intervals.

The DVD recorder 60 receives the operation state saved electricity request command. When the current operation state is caused by the above-mentioned operation mode switching, the DVD recorder 60 transmits an operation state saved electricity notification command having, as a parameter, a difference between electricity consumption in a normal operation state and the electricity consumption in the current operation state, to the TV 50.

The TV 50 receives the operation state saved electricity notification command, and calculates a product of the electricity consumption difference shown by the parameter in the command and the transmission time interval of the operation state saved electricity request command. The TV 50 adds the product to a value stored in the saved electricity consumption amount storage unit 503. In this way, the amount of saved electricity consumption of the DVD recorder 60 is stored in the saved electricity consumption amount storage unit 503.

Figure 20:
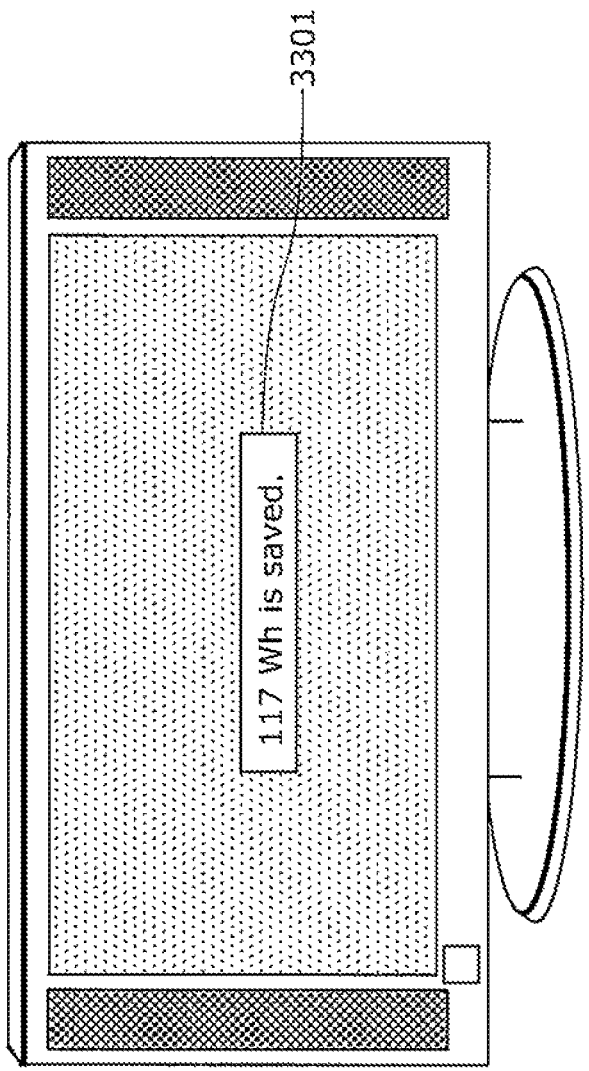
FIG. 20 is a diagram showing an example of an OSD display for notifying the user of an amount of saved electricity consumption, in the TV 50 in the second embodiment of the present invention.

In addition, having received the operation state electricity consumption notification command and the operation state saved electricity notification command, the TV 50 displays the current operation state of the apparatus transmitting the commands on the screen of the TV 50, as shown by an OSD display 3301 in FIG. 20.

Furthermore, the electricity consumption amount storage unit 502 in the TV 50 stores a pair of a value corresponding to the current day and a recording date and time in the log recording unit in the electricity consumption amount storage unit 502, at regular time intervals such as 24-hour intervals. Having stored the pair of the amount of electricity consumption for the regular time interval and the recording time in the recording unit in this way, the electricity consumption amount storage unit 502 resets the value in the current-day storage unit in the electricity consumption amount storage unit 502 to 0.

Note that the time intervals of recording a log of the amount of electricity consumption and the amount of saved electricity consumption are not limited to 24-hour intervals, so long as they are regular time intervals. Here, the log recording unit records, for example, a log corresponding to 30 days, and deletes the log in order of occurrence when 30 days are exceeded.

Moreover, having received the operation state electricity consumption notification command and the operation state saved electricity notification command, the TV 50 may display not only the operation state of the apparatus but also the current electricity consumption.

Here, electricity consumption or saved electricity may be displayed using a numeric value of electricity, a ratio to maximum electricity consumption in the apparatus, or an icon that changes in proportion to the numeric value of electricity or the ratio of electricity.

In this way, the TV 50 can obtain the amount of electricity consumption and the amount of saved electricity consumption of the DVD recorder 60.

The TV 50 can equally obtain the amount of electricity consumption and the amount of saved electricity consumption of the set-top box 70, as a result of the transmission of the operation state electricity consumption request command and the operation state saved electricity request command.

(Electricity Consumption Amount Display by the TV 50)

The following describes the case where the user operates the remote control 40 of the TV 50 or a menu of the TV 50 to display an amount of electricity consumption and an amount of saved electricity consumption.

First, the TV 50 references the electricity consumption amount storage unit 502 and the saved electricity consumption amount storage unit 503 in the TV 50, and obtains electricity consumption amount information and saved electricity consumption amount information. The TV 50 calculates a total amount of electricity consumption of the apparatuses, and displays the amount of electricity consumption on a daily basis. For example, as shown by the OSD display 2002 in FIG. 12, an amount of electricity consumption from 30 days ago up to 1 day ago is displayed where a horizontal axis represents a time and a vertical axis represents an amount of electricity consumption. In the same manner, the TV 50 calculates a total amount of saved electricity consumption on a daily basis and displays it on the screen.

Here, values stored in the electricity consumption amount storage unit 502 and the saved electricity consumption amount storage unit 503 in the TV 50 may be added respectively to the displayed amount of electricity consumption and amount of saved electricity consumption.

Moreover, the amount of electricity consumption and the amount of saved electricity consumption may be OSD-displayed when the user powers ON the TV 50 and the TV 50 starts video output.

Thus, the amount of electricity consumption and the amount of saved electricity consumption of the TV 50, the DVD recorder 60, and the set-top box 70 can be displayed to the user.

Note that the power control of each component is not limited to the microcomputer or the like shown in the above embodiments, and may instead be performed by another power control unit that performs only power control.

The first and second embodiments describe an example where the TV, as a master apparatus in the AV system, transmits a control command to the DVD recorder and the set-top box to thereby switch the operation mode of the DVD recorder and the set-top box. However, the present invention is not limited to such, and the DVD recorder or the set-top box may serve as the master in the AV system.

Figure 21:
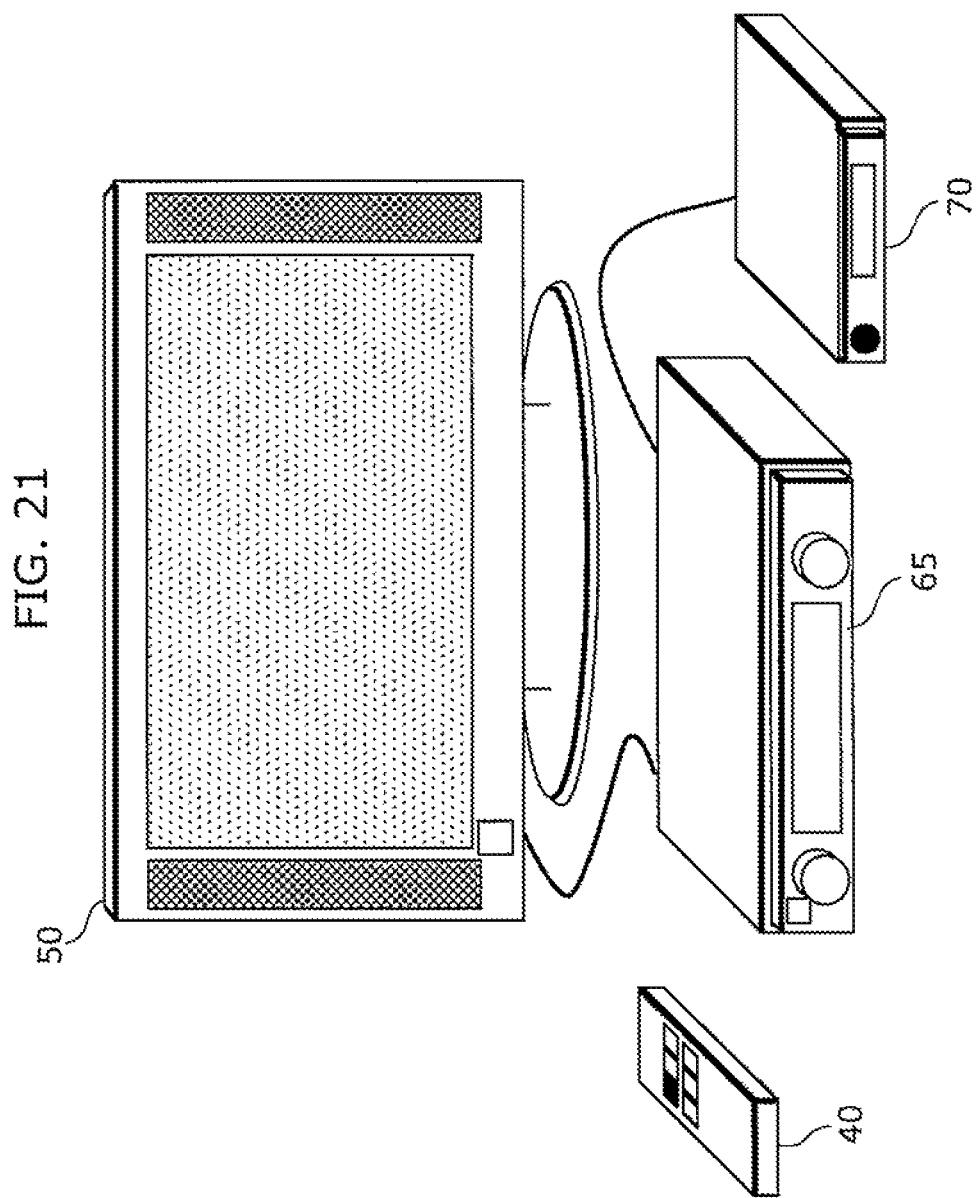
FIG. 21 is a structural diagram of an AV system including an AV amplifier 65.

Moreover, the first and second embodiments describe the case where the TV, the DVD recorder, and the set-top box are connected in the AV system, but this is not a limit for the present invention. For example, as shown in FIG. 21, the TV 50, an AV amplifier 65, and the set-top box 70 may be connected in the AV system. In this case, for example, the AV amplifier 65 has a plurality of operation modes as shown in FIG. 22, where the AV amplifier 65 in a power-OFF state has at least the power-OFF operation mode 1 and the power-OFF operation mode 2. The structures and operations in this case are the same as those in the first and second embodiments, and so their description is omitted.

As described above, in the AV system where a plurality of apparatuses that each have a plurality of operation states of different electricity consumption are connected via a communication network such as HDMI, the plurality of operation states can be controlled so as to improve electricity consumption efficiency in the AV system. In detail, suppose one apparatus has the power-OFF operation mode 1 in which the apparatus is in a power-OFF state but a part of the apparatus is supplied with power, and the power-OFF operation mode 2 in which fewer functions are operational than in the power-OFF operation mode 1 and therefore electricity consumption is lower than the power-OFF operation mode 1. For example, the apparatus which is in the power-OFF operation mode 1 switches its operation state to the power-OFF operation mode 2 of lower electricity consumption, on the basis of a control command or the like received from a master apparatus. Such control contributes to efficient electricity consumption of the apparatus.

Thus, according to the present invention, an operation state of a connected apparatus is switched by a control command or the like of another apparatus, with it being possible to improve electricity consumption efficiency. Hence, an electrical power saving system that achieves efficient electricity consumption of apparatuses connected via a communication network can be realized.

Note that the TV in the AV system described above is one embodiment of a video display apparatus capable of displaying video, and the video display apparatus is one particular embodiment of the first apparatus according to the present invention. Likewise, each of the DVD recorder and the set-top box is one embodiment of a video recording apparatus capable of recording and reproducing video, and the video recording apparatus is one particular embodiment of the second apparatus according to the present invention.

Although the electrical power saving system according to the present invention has been described by way of the above embodiments, the present invention is not limited to the above embodiments. Applying various changes conceivable by a person skilled in the art to the embodiments and combining components in the different embodiments are also included in the scope of the present invention without departing from the principles of the present invention.

INDUSTRIAL APPLICABILITY

The present invention is applicable to an electrical power saving system. In particular, the present invention is applicable to an electrical power saving system, such as an AV system, in which an operation mode is switched by performing transmission and reception of a control command between apparatuses connected via a communication network.

The invention claimed is:

1. An electrical power saving system comprising at least a first apparatus, a second apparatus, and a third apparatus that are connected to each other via a communication network, each of said second apparatus and said third apparatus transmitting a video and audio signal to said first apparatus, each of said first apparatus, said second apparatus, and said third apparatus including:
   a transmission and reception unit configured to transmit and receive a control command via the communication network, the control command being a command by which one apparatus controls another apparatus; and
   an operation state switching unit configured to switch an operation state according to the control command,
   wherein each of said first apparatus, said second apparatus, and said third apparatus has at least a first OFF operation mode and a second OFF operation mode as operation states that differ in electricity consumption, the first OFF operation mode being an operation state in which said apparatus is in a power-OFF state but a part of said apparatus is supplied with power, and the second OFF operation mode being an operation state of lower electricity consumption than the first OFF operation mode,
   said operation state switching unit in said second apparatus is configured to switch the operation state of said second apparatus from the first OFF operation mode to the second OFF operation mode in the case where, when said second apparatus is in the first OFF operation mode, said transmission and reception unit in said second apparatus receives any of: a control command instructing to switch the operation state, from said first apparatus; and a control command indicating that said third apparatus transmits video to said first apparatus, from said third apparatus,
   said operation state switching unit in said third apparatus is configured to switch the operation state of said third apparatus from the first OFF operation mode to the second OFF operation mode in the case where, when said third apparatus is in the first OFF operation mode, said transmission and reception unit in said third apparatus receives any of: the control command instructing to switch the operation state, from said first apparatus; and a control command indicating that said second apparatus transmits video to said first apparatus, from said second apparatus, and
   said transmission and reception unit in said first apparatus is configured to transmit the control command instructing to switch the operation state, to any of said second apparatus and said third apparatus.

2. The electrical power saving system according to claim 1, wherein any of said second apparatus and said third apparatus further includes
   a timer unit configured to count an elapse of a predetermined time,
   said operation state switching unit in said second apparatus is configured to switch the operation state of said second apparatus from the first OFF operation mode to the second OFF operation mode, when said timer unit in said second apparatus counts the elapse of the predetermined time during which said second apparatus is in the first OFF operation mode, and
   said operation state switching unit in said third apparatus is configured to switch the operation state of said third apparatus from the first OFF operation mode to the second OFF operation mode, when said timer unit in said third apparatus counts the elapse of the predetermined time during which said third apparatus is in the first OFF operation mode.

3. The electrical power saving system according to claim 1, wherein said first apparatus further includes:
   a holding unit configured to hold a state table showing combinations of operation states of each of said first apparatus, said second apparatus, and said third apparatus;
   a display unit configured to display the state table to a user; and
   an input unit configured to allow the user to select a desired combination from the state table displayed by said display unit, and
   said first apparatus transmits the control command instructing to switch the operation state to said second apparatus and said third apparatus, according to the selected desired combination.

4. An electrical power saving system comprising at least a video display apparatus, a video recording apparatus, and a video reproduction apparatus that are connected to each other via a communication network, each of said video recording apparatus and said video reproduction apparatus transmitting a video and audio signal to said video display apparatus, each of said video display apparatus, said video recording apparatus, and said video reproduction apparatus including:
   a transmission and reception unit configured to transmit and receive a control command via the communication network, the control command being a command by which one apparatus controls another apparatus; and
   an operation state switching unit configured to switch an operation state according to the control command, wherein each of said video display apparatus, said video recording apparatus, and said video reproduction apparatus has at least a first OFF operation mode and a second OFF operation mode as operation states that differ in electricity consumption, the first OFF operation mode being an operation state in which said apparatus is in a power-OFF state but a part of said apparatus is supplied with power, and the second OFF operation mode being an operation state of lower electricity consumption than the first OFF operation mode, said operation state switching unit in said video recording apparatus is configured to switch the operation state of said video recording apparatus from the first OFF operation mode to the second OFF operation mode in the case where, when said video recording apparatus is in the first OFF operation mode, said transmission and reception unit in said video recording apparatus receives any of: a control command instructing to switch the operation state, from said video display apparatus; and a control command indicating that said video reproduction apparatus transmits video to said video display apparatus, from said video reproduction apparatus, said operation state switching unit in said video reproduction apparatus is configured to switch the operation state of said video reproduction apparatus from the first OFF operation mode to the second OFF operation mode in the case where, when said video reproduction apparatus is in the first OFF operation mode, said transmission and reception unit in said video reproduction apparatus receives any of: the control command instructing to switch the operation state, from said video display apparatus; and a control command indicating that said video recording apparatus transmits video to said video display apparatus, from said video recording apparatus, and said transmission and reception unit in said video display apparatus is configured to transmit the control command instructing to switch the operation state, simultaneously to said video recording apparatus and said video reproduction apparatus.

5. An electrical power saving method of at least a first apparatus, a second apparatus, and a third apparatus connected to each other via a communication network, each of the first apparatus, the second apparatus, and the third apparatus including: a transmission and reception unit that transmits and receives a control command via the communication network, the control command being a command by which one apparatus controls another apparatus; and an operation state switching unit that switches an operation state according to the control command, each of the first apparatus, the second apparatus, and the third apparatus having at least a first OFF operation mode and a second OFF operation mode as operation states that differ in electricity consumption, the first OFF operation mode being an operation state in which the apparatus is in a power-OFF state but a part of the apparatus is supplied with power, and the second OFF operation mode being an operation state of lower electricity consumption than the first OFF operation mode, said electrical power saving method comprising:

when the second apparatus is in the first OFF operation mode, receiving, by the transmission and reception unit in the second apparatus, a control command instructing to switch the operation state from the first apparatus, and switching, by the operation state switching unit in the second apparatus, the operation state of the second apparatus from the first OFF operation mode to the second OFF operation mode;

when the third apparatus is in the first OFF operation mode, receiving, by the transmission and reception unit in the third apparatus, the control command instructing to switch the operation state from the first apparatus, and switching, by the operation state switching unit in the third apparatus, the operation state of the third apparatus from the first OFF operation mode to the second OFF operation mode; and transmitting, by the transmission and reception unit in the first apparatus, the control command instructing to switch the operation state, simultaneously to the second apparatus and the third apparatus.

6. An electrical power saving system comprising at least a first apparatus, a second apparatus, and a third apparatus that are connected to each other via a communication network, each of said second apparatus and said third apparatus transmitting a video and audio signal to said first apparatus, each of said first apparatus, said second apparatus, and said third apparatus including:

a transmission and reception unit configured to transmit and receive a control command via the communication network, the control command being a command by which one apparatus controls another apparatus; and an operation state switching unit configured to switch an operation state according to the control command, wherein each of said second apparatus and said third apparatus has at least a first OFF operation mode and a second OFF operation mode as operation states that differ in electricity consumption, the first OFF operation mode being an operation state in which said apparatus is in a power-OFF state but a part of said apparatus is supplied with power, and the second OFF operation mode being an operation state of lower electricity consumption than the first OFF operation mode, said operation state switching unit in said second apparatus is configured to switch the operation state of said second apparatus from the first OFF operation mode to the second OFF operation mode in the case where, when said second apparatus is in the first OFF operation mode, said transmission and reception unit in said second apparatus receives a control command instructing to switch the operation state, from said first apparatus, said operation state switching unit in said third apparatus is configured to switch the operation state of said third apparatus from the first OFF operation mode to the second OFF operation mode in the case where, when said third apparatus is in the first OFF operation mode, said transmission and reception unit in said third apparatus receives the control command instructing to switch the operation state, from said first apparatus, and when said first apparatus receives, from one of said second apparatus and said third apparatus, a control command indicating that said one of said second apparatus and said third apparatus transmits the video and audio signal, said first apparatus transmits the control command instructing to switch the operation state, to an other one of said second apparatus and said third apparatus.

* * * * *